United States Patent
Suematsu et al.

(10) Patent No.: US 8,412,130 B2
(45) Date of Patent: Apr. 2, 2013

(54) MILLIMETER WAVE TRANSCEIVING SYSTEM AND REFLECTING PLATE

(75) Inventors: Eiji Suematsu, Osaka (JP); Tohru Yamamoto, Osaka (JP); Keisuke Sato, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 742 days.

(21) Appl. No.: 12/615,395

(22) Filed: Nov. 10, 2009

(65) Prior Publication Data

US 2010/0119234 A1    May 13, 2010

(30) Foreign Application Priority Data

Nov. 12, 2008   (JP) ................................. 2008-289927

(51) Int. Cl.
*H04C 1/52* (2006.01)

(52) U.S. Cl. ........... 455/106; 455/25; 455/63.4; 455/74; 381/160

(58) Field of Classification Search .................. 455/106, 455/25, 63.4, 74, 575.7; 381/160; 725/78
See application file for complete search history.

(56) References Cited

U.S. PATENT DOCUMENTS

| | | | |
|---|---|---|---|
| 5,091,730 A * | 2/1992 | Cardiasmenos et al. ...... | 342/153 |
| 5,184,136 A * | 2/1993 | Cardiasmenos .............. | 342/153 |
| 5,697,063 A | 12/1997 | Kishigami et al. | |
| 5,890,055 A * | 3/1999 | Chu et al. ......................... | 455/16 |
| 7,020,890 B1 * | 3/2006 | Suematsu et al. ............... | 725/78 |
| 7,046,959 B2 * | 5/2006 | Ammar et al. ................ | 455/13.1 |
| 7,076,201 B2 * | 7/2006 | Ammar ......................... | 455/3.02 |
| 7,164,932 B1 * | 1/2007 | Sato et al. .................. | 455/562.1 |
| 7,206,591 B2 * | 4/2007 | Ammar et al. ................ | 455/502 |
| 2009/0029648 A1 * | 1/2009 | Kawasaki ..................... | 455/41.3 |
| 2009/0202088 A1 * | 8/2009 | Sekino et al. ................. | 381/160 |
| 2012/0206299 A1 * | 8/2012 | Valdes-Garcia .............. | 342/359 |

FOREIGN PATENT DOCUMENTS

| | | |
|---|---|---|
| JP | 5-206946 A | 8/1993 |
| JP | 06-200584 A | 7/1994 |
| JP | 08-223172 A | 8/1996 |
| JP | 08-288901 A | 11/1996 |
| JP | 9-51293 A | 2/1997 |
| JP | 2002-246832 A | 8/2002 |
| JP | 2005-210632 A | 8/2005 |
| JP | 2005-244362 A | 9/2005 |
| WO | WO 2007/136290 A1 | 11/2007 |

* cited by examiner

*Primary Examiner* — Minh D Dao
(74) *Attorney, Agent, or Firm* — Birch, Stewart, Kolasch & Birch, LLP

(57) ABSTRACT

A millimeter wave transceiving system 100 for transmitting and receiving a millimeter wave includes a transmitting apparatus 1 for transmitting a millimeter wave, a reflecting plate 41 for reflecting a millimeter wave transmitted from the transmitting apparatus 1, and a receiving apparatus 2 for receiving a millimeter wave reflected by the reflecting plate 41. The reflecting plate 41 includes a metal plate, a metal sheet, or a metal film, as a reflecting surface 43 for reflecting a millimeter wave. This makes it possible to realize a millimeter wave transceiving system which allows an easy installation.

15 Claims, 13 Drawing Sheets

FIG. 4
(a)
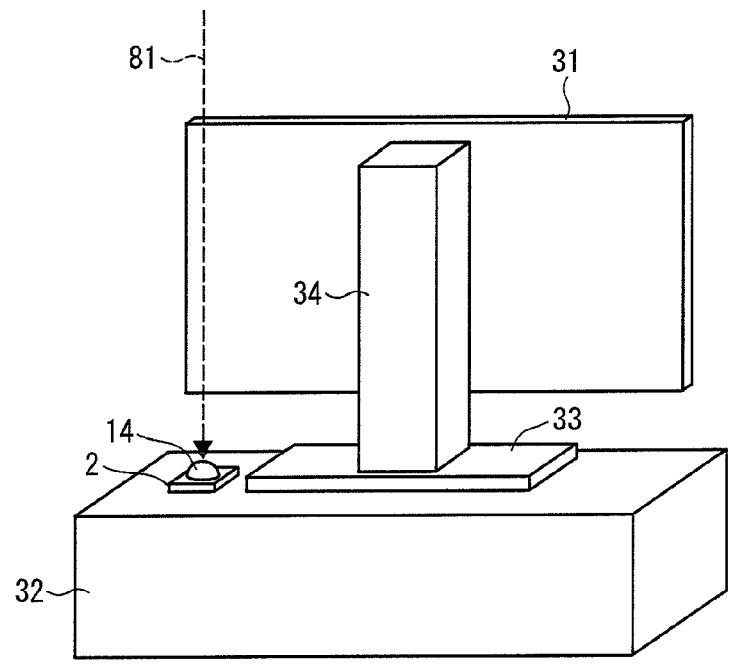
(b)
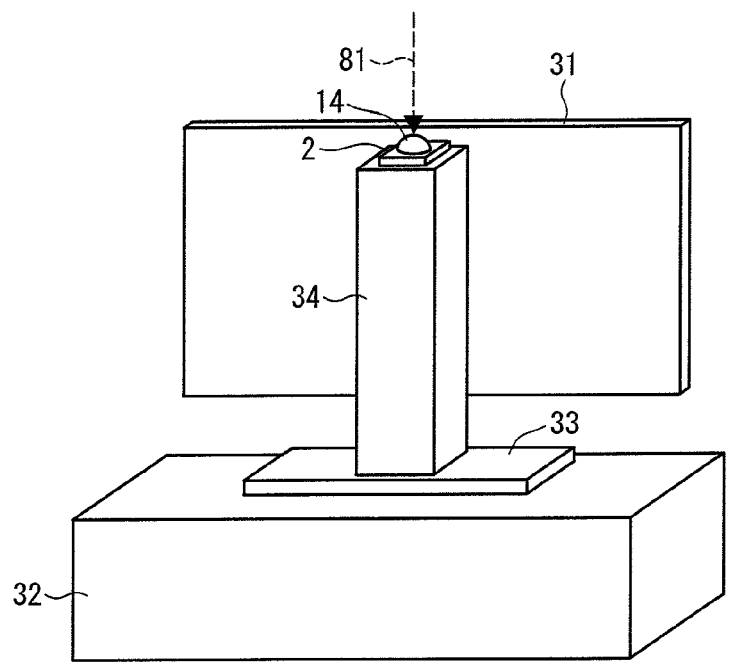

MILLIMETER WAVE TRANSCEIVING SYSTEM AND REFLECTING PLATE

This Nonprovisional application claims priority under 35 U.S.C. §119(a) on Patent Application No. 2008-289927 filed in Japan on Nov. 12, 2008, the entire contents of which are hereby incorporated by reference.

TECHNICAL FIELD

The present invention relates to a millimeter wave transceiving system for wirelessly transmitting and receiving a broadcast wave in a millimeter waveband.

BACKGROUND ART

An indoor wireless communications system such as that disclosed in Patent Literature 1 and an optical space transmission system such as that disclosed in Patent Literature 2 are known as conventional wireless communications systems.

FIG. 12 is a schematic diagram illustrating an arrangement of the indoor wireless communications system disclosed in Patent Literature 1, which is a first conventional example.

As illustrated in FIG. 12, a signal transmitted via a master antenna 820 from a master 810 installed on a wall surface near a ceiling almost uniformly propagates via a propagation path 890 under a surface of the ceiling. Then, the signal is reflected by a secondary reflecting mirror 850 so as to propagate, via a propagation path 900, toward a floor surface. The signal is ultimately received by a slave 830, via a slave antenna 840 installed so as to have directional characteristics toward the surface of the ceiling. In the example, the secondary reflecting mirror 850 is provided so as to be rotated clockwise by approximately 45° with respect to a horizontal surface.

FIG. 13 is a schematic diagram illustrating an arrangement of a reflecting mirror used in the optical space transmission system disclosed in Patent Literature 2, which is a second conventional example.

The optical space transmission system disclosed in Patent Literature 2 also utilizes a reflecting mirror illustrated in FIG. 13, as is the case with the first conventional example. As illustrated in FIG. 13, the reflecting mirror of the second conventional example is composed of a base 310 fixed to a ceiling, and a reflecting mirror 330 rotatably attached to a shaft 320 provided on and perpendicular to the base 310. The reflecting mirror 330, which causes incident light to be subjected to a total reflection, is attached to the shaft 320 so as to be rotatable horizontally or vertically.

Citation List

Patent Literature 1

Japanese Patent Application Publication, Tokukaihei, No. 9-51293 A (Publication Date: Feb. 18, 1997)

Patent Literature 2

Japanese Patent Application Publication, Tokukaihei, No. 5-206946 A (Publication Date: Aug. 13, 1993)

SUMMARY OF INVENTION

Technical Problem

Unfortunately, the arrangements of the respective conventional examples have the following problems due to use of the respective reflecting mirrors. (1) The reflecting mirrors are made from a material such as glass because the reflecting mirrors are mirrors. As a result, the reflecting mirrors are heavy. This makes it difficult to attach each of the reflecting mirrors to a ceiling itself. (2) It is difficult to adjust, with high accuracy, an angle of each of the reflecting mirrors. For this reason, each of the reflecting mirrors preferably has a biaxial rotary mechanism.

With regard to the problem (1), most ceilings, irrespective of stand-alone houses and condominiums, have been recently made from gypsum boards or pieces of plywood. A ceiling board itself which is made from such a material has a low strength. Therefore, it is necessary to take measures, for example, to fix a heavy object such as a mirror, using a screw, to a skeleton framework of timber so that the ceiling can hold the heavy object. This limits a location where a reflecting mirror is provided, and requires a user to be cautious about falling of the reflecting mirror. In addition, it is difficult for an amateur user to install the reflecting mirror. As a result, it is necessary to ask a person such as a specialized staff to install the reflecting mirror.

With regard to the problem (2), since the reflecting mirror is heavy, a rotary mechanism, utilizing a rotating sphere used in a device such as a tripod for a camera, is an example of a rotary mechanism that allows an angle adjustment. Unfortunately, the problem occurs that such a rotary mechanism does not have an accuracy in rotation angle of 1 (one) degree. In addition, it is necessary to adopt a function of three-dimensional angle adjustment, e.g., a biaxial rotary function having a function of horizontal rotation angle adjustment and a function of depression angle adjustment. It is very difficult to carry out an angle adjustment with high accuracy, partly because such an angle adjustment is carried out in a high place.

The present invention was made in view of the problems. An object of the present invention is to realize a millimeter wave transceiving system which allows an easy installation.

Solution to Problem

In order to attain the object, a millimeter wave transceiving system of the present invention for transmitting and receiving a millimeter wave, includes: a transmitting apparatus for transmitting a millimeter wave; a reflecting plate for reflecting a millimeter wave transmitted from the transmitting apparatus; and a receiving apparatus for receiving a millimeter wave reflected by the reflecting plate, the reflecting plate having a metal plate, a metal sheet, or a metal film, as a reflecting surface from which the millimeter wave is reflected.

A reflecting plate of the present invention in a millimeter wave transceiving system, the millimeter wave transceiving system includes: a transmitting apparatus for transmitting a millimeter wave; a reflecting plate for reflecting a millimeter wave transmitted from the transmitting apparatus; and a receiving apparatus for receiving a millimeter wave reflected by the reflecting plate, the reflecting plate comprising a metal plate, a metal sheet, or a metal film, as a reflecting surface from which a millimeter wave is reflected.

According to the arrangement, a millimeter wave (which is classified as a micrometer wave) transmitted from the transmitting apparatus is reflected by the reflecting plate. The millimeter wave thus reflected by the reflecting plate is received by the receiving apparatus. The reflecting plate itself reflects a millimeter wave. Therefore, the arrangement in which the reflecting surface of the reflecting plate includes a metal plate, a metal foil, or a metal film allows the reflecting plate to sufficiently reflect a millimeter wave. This eliminates the need for realizing the reflecting plate as a reflecting mirror made of a mirror etc. This realizes a lightweight reflecting plate.

The reflecting surface can be made from a material, provided the material has a high reflection coefficient in a microwave band. Specifically, the reflecting surface can be made from a material such as a sheet, a paint, a thin film, a thin plate, or a tape, which material is, an electrically conductive material having a reflection coefficient of nearly 1 (i.e., semiconductive).

That is, the metal plate, the metal sheet, or the metal film, which is used to form the reflecting surface, can have a small film thickness. For example, the reflecting surface can be made of an aluminum plate having a thickness from approximately 0.5 mm to approximately 1 mm. Further, there is no need to form the whole reflecting plate by use of a metal. For example, the reflecting plate can be formed by attaching an aluminum tape on an expanded polystyrene sheet having a thickness of a few millimeters or on a polypropylene sheet having a thickness not more than 1 mm.

The arrangement realizes a reflecting plate which is significantly light (i.e., the reflecting plate has a weight comparable to that of a plastic sheet for a stationery use). As a result, the reflecting plate can be easily installed, with the use of a screw, a tape, or the like, on a ceiling board made from a gypsum board or a piece of plywood. This reduces a load on the ceiling. As a result, the ceiling hardly falls or peels off. Even if the ceiling falls, the ceiling does not injure a person nor break a thing. Therefore, the arrangement improves ease and accuracy of installation, and also remarkably improves safety, as compared to installation of a reflecting mirror. In other words, according to the arrangement, it is possible to reduce a size and weight of the reflecting plate since a reflecting mirror is not used. Therefore, the arrangement allows an amateur user to install the reflecting mirror.

As described above, the arrangement makes it possible to realize a millimeter wave transceiving system which allows an easy installation.

The millimeter wave transceiving system is preferably arranged such that the reflecting plate further has: a first plate having the reflecting surface; and a second plate provided so as to be inclined with respect to the first plate.

According to the arrangement, the first and second plates are provided so as to be inclined with respect to each other. This eliminates the need for adjustment of a depression angle in a case where the reflecting plate is provided on the ceiling. As a result, angle adjustment of the reflecting plate becomes remarkably easy because only horizontal angle adjustment is necessary.

According to the arrangement, in a case where the reflecting plate is fixed to, e.g., a ceiling, the second plate is fixed thereto. The reflecting plate thus includes the second plate for fixing the reflecting plate. This allows a large installation area between the second plate and a ceiling etc.

For example, the second plate is arranged to have the same size as that of the reflecting plate which is the first plate. Specifically, each of the first and second plates is arranged to have an area of approximately 15 square centimeters. As a result, the second plate has an area of 15 square centimeters. Contact between the ceiling and the second plate makes it possible to fix the reflecting plate to the ceiling by use of a screw, a tape, or the like. The arrangement makes it possible to stably install the reflecting plate and secure accuracy of the inclination angle (e.g., 45°) defined by the first plate and the second plate. This allows suppression of an angle change over time caused after the installation, and stable wireless transmission path.

In a case where the reflecting plate is fixed, the reflecting plate can be installed simply by the following installation method. A rotation angle of the reflecting plate is adjusted by rotating the reflecting plate only horizontally so that (i) a direction of a millimeter wave (electric wave) incident on the first plate becomes horizontal and in right front of the first plate, and (ii) the receiving apparatus receives a transmission signal having a maximum reception level or a maximum reception C/N ratio. Then, the reflecting plate is fixed. Accordingly, a biaxial rotary mechanism is unnecessary unlike a conventional reflecting mirror.

Further, the reflecting plate itself can be made of an expanded polystyrene sheet having a thickness of few millimeters, a polypropylene sheet having a thickness not more than 1 mm, or the like. This allows fine workability. As a result, it is possible to easily form the first and second plates by use of an adhesion or the like.

In the case of a metal plate such as an aluminum plate having a thickness from approximately 0.3 mm to approximately 1 mm, the first and second plates can be formed by folding at an angle of, e.g., 45°, a flat aluminum plate having an area of 15 cm by 30 cm. It is possible that a sheet such as a thin piece of paper or a plastic sheet to which a design is subjected is further attached onto the first plate made of an aluminum plate. A millimeter wave mostly passes through the sheet, and then, is reflected by the aluminum plate. The decoration makes it possible to lessen an adverse affect on scenery of a room due to presence of the reflecting plate.

Preferably, an inclination angle formed between the first and second plates is approximately 45°. This makes it possible to prevent a direction in which a millimeter wave is reflected by the reflecting plate from greatly deviating from a vertical downward direction even if a horizontal angle of the reflecting plate is adjusted in a case where the reflecting plate is installed on, e.g., the ceiling so that the second plate of the reflecting plate becomes horizontal.

In a case where the first and second plates are arranged to have an inclination angle of approximately 45°, it is possible to easily install the reflecting plate by use of a level gauge and a 45° clinometer because, recently, a reasonable installation tool is available in which a 45° clinometer is added to a level gauge or a plummet instrument.

The millimeter wave transceiving system is preferably arranged such that the reflecting plate further includes a spacer for maintaining a constant distance between the first plate and the second plate. According to the arrangement, the first plate is provided away from the ceiling by a distance maintained by the spacer in a case where the reflecting plate is provided on a ceiling. As a result, a probability that a millimeter wave reflected at the ceiling is received by the receiving apparatus is extremely low. This accordingly reduces an effect of multipath fading, thereby realizing a fine reception characteristic. As a result, this realizes a fine reception quality, i.e., a higher MER (Measurement Error Rate) and a higher C/N (Carrier to Noise Ratio) characteristic. Further, this allows a user to easily put his hand inside the reflecting plate. This allows an easy installation and an easy screw fixation.

The millimeter wave transceiving system is preferably arranged such that the transmitting apparatus includes a directional transmitting antenna for transmitting a millimeter wave; and the receiving apparatus includes a directional receiving antenna for receiving a millimeter wave reflected by the reflecting plate.

According to the arrangement, the transmitting apparatus can correctly transmit a millimeter wave in a direction of directivity of the directional transmitting antenna. On the other hand, the receiving apparatus can correctly receive a millimeter wave transmitted from a direction of directivity of the directional receiving antenna.

The millimeter wave transceiving system is preferably arranged such that an area of the reflecting surface of the reflecting plate is not less than a square of a half wavelength but not more than $\sqrt{2} \cdot (2h \cdot \tan\theta) \cdot (2h \cdot \tan\theta)$, where h represents a distance between a surface on which the reflecting plate is provided and the receiving apparatus, and θ represents a half bandwidth of the directional receiving antenna.

According to the arrangement, an area of the reflecting surface at a distance h is not more than an irradiated area of the directional receiving antenna (i.e., reception area of a millimeter wave). This makes it possible to secure reflection efficiency and prevent the reflecting plate from increasing in its size. Accordingly, it is possible to save space, such as that on the ceiling, for installing the reflecting plate. In addition, an adverse effect on a room appearance can be reduced.

An irradiated area of the directional receiving antenna of the receiving apparatus accordingly has a size of (2h·tan θ)×(2h·tan θ). Inclining the reflecting surface vertically by 45° results in a longitudinal length of the reflecting surface of $\sqrt{2}$·(2h·tan θ) with respect to a transmission path. As a result, an area of the reflecting surface becomes $\sqrt{2}$·(2h·tan θ)·(2h·tan θ). A smallest area of the reflecting surface is a square of a half wavelength of an operating frequency. In the case of an area smaller than this, the reflecting surface has difficulty in serving as a reflecting surface. Therefore, the reflecting plate requires an area sufficiently larger than a square of a half wavelength of an operating frequency.

The millimeter wave transceiving system is preferably arranged such that the directional transmitting antenna has an angle of beam spread of not less than an angle of beam spread of the directional receiving antenna. According to the arrangement, an angle of beam spread of the directional receiving antenna can be determined depending on an area of the reflecting surface of the reflecting plate. The arrangement allows an easy installation etc. because the arrangement ensures irradiation of a beam on an entire surface of the reflecting plate, thereby allowing an increase in a degree of freedom for positional relations among the transmitting apparatus, the reflecting plate, and the receiving apparatus.

The millimeter wave transceiving system is preferably arranged such that the reflecting surface has a concave shape.

According to the arrangement, the reflecting surface arranged to have a concave shape causes a millimeter wave reflected on the reflecting surface to converge on the receiving apparatus. This makes it possible to transmit a millimeter wave which converges on the receiving apparatus. This allows development of a millimeter wave transceiving system having a higher sensitivity. Specifically, for example, a focal length of the reflecting surface having a concave shape is adjusted to a position approximately 45 cm above a floor (i.e., height of the television rack; approximately 2 m from the ceiling). This makes it possible to converge a millimeter wave on the directional receiving antenna of the receiving apparatus. This allows development of a millimeter wave transceiving system having an excellent sensitivity characteristic. In this case, since a diameter of curvature of the reflecting surface having a concave shape is 4 m. Accordingly, the reflecting surface has a gentle curve.

The millimeter wave transceiving system is preferably arranged such that the receiving apparatus is provided on a surface of a display apparatus having a rotary shaft and on an extension of the rotary shaft.

According to the arrangement, the receiving apparatus is provided on a surface of a display apparatus having a rotary shaft and on an extension of the rotary shaft. This almost eliminates displacement of relative positions between the reflecting plate and the receiving apparatus even if the display apparatus includes a mechanism for vertically rotating, i.e., even if the display apparatus rotates around the rotary shaft. This allows stable reception.

The millimeter wave transceiving system is preferably arranged such that a direction in which the directional receiving antenna has directivity is a vertical direction. According to the arrangement, a millimeter wave is not blocked even if a person cuts across in front of the directional receiving antenna. Similarly, a millimeter wave is not blocked even if a thing such as a piece of fixture and furniture is placed in the vicinity of the directional receiving antenna. This makes it possible to stably transmit and receive a millimeter wave.

The millimeter wave transceiving system is preferably arranged such that the receiving apparatus is provided on a back surface side of a display apparatus, the back surface side being opposite to a side of a display screen of the display apparatus. According to the arrangement, the receiving apparatus is provided on a rack or the like on a side of the back surface of the display apparatus relative to a side of the display screen of the display apparatus, or provided on a central area of the back surface. This makes the receiving apparatus less noticeable from the side of the display screen. As a result, this makes it possible to maintain a neat view of a room.

The millimeter wave transceiving system is preferably arranged such that the directional receiving antenna is a lens antenna made of a dielectric. The arrangement makes it difficult to put a thing on the directional receiving antenna in a case where the receiving apparatus is provided on a rack for the display apparatus since the lens antenna has a hemispherical shape. This makes it possible to reduce a frequency of blockage of a millimeter wave.

The millimeter wave transceiving system is preferably arranged such that the transmitting apparatus: (i) includes modulation means for generating a modulated signal, by modulating a received wireless broadcast signal in accordance with a reference signal; and (ii) upconverts the modulated signal generated by the modulation means and the reference signal into a transmission signal, amplifies the transmission signal so as to obtain the millimeter wave, and transmits the transmission signal via the directional transmitting antenna, and the receiving apparatus: (I) receives, via the directional receiving antenna, the transmission signal transmitted via the directional transmitting antenna; and (II) includes: amplification means for amplifying a received transmission signal; and downconversion means for demodulating a modulated signal, by downconverting a modulated signal in accordance with a reference signal contained in a transmission signal amplified by the amplification means.

According to the arrangement, upon reception of a wireless broadcast signal, the transmitting apparatus modulates the wireless broadcast signal in accordance with a reference signal, thereby obtaining a modulated signal. The transmitting apparatus then upconverts the modulated signal and the reference signal into a transmission signal. Then, the transmitting apparatus amplifies the transmission signal thus upconverted, thereby obtaining a millimeter wave. Then, the transmitting apparatus transmits the millimeter wave to the receiving apparatus.

In summary, the reference signal and the modulated signal are transmitted as a transmission signal (transmission wave) via the directional transmitting antenna. Then, the transmission signal is received by the directional receiving antenna. Therefore, respective decreases of signal levels (signal strengths) of the reference signal and the modulated signal are small, and a plurality of reflected waves are not caused. As a result, a drop in level of each signal component is small (over a wide range of frequencies) which drop is caused by respective phase shits of the wireless signal and the reference signal. That is, the transmitting apparatus can transmit a transmission signal to the receiving apparatus, with the suppression of respective decreases in signal levels of a wireless signal and a reference signal.

Then, the receiving apparatus can (i) amplify, by the amplification means, the transmission signal received via the directional receiving antenna, (ii) downconvert, by the downconversion means, the modulated signal in accordance with the reference signal of the transmission signal thus amplified, and (iii) decode the modulated signal thus downconverted. Thus, the modulated signal can be regenerated by the receiving apparatus as a signal identical with the wireless signal received by the transmitting apparatus.

The arrangement in which a modulated signal is downconverted by the downconversion means in accordance with a reference signal eliminates the need for a local oscillator. Also, with the arrangement, a frequency deviation and a phase noise of the local oscillator etc. used in upconversion by the transmitting apparatus can be canceled by downconversion by the receiving apparatus. This allows the millimeter wave transceiving system to not only exercise its capability excellent in a noise characteristic and a reception characteristic, but also realize downsizing and cost-cutting, especially on a receiving apparatus side.

The millimeter wave transceiving system is preferably arranged such that the transmitting apparatus: (i) includes modulation means for generating a modulated signal, by modulating a received wireless broadcast signal in accordance with a reference signal; and (ii) upconverts the modulated signal generated by the modulation means and the reference signal into a transmission signal, amplifies the transmission signal so as to obtain the millimeter wave, and transmits the transmission signal via the directional transmitting antenna, and the receiving apparatus: (I) receives, via the directional receiving antenna, the transmission signal transmitted via the directional transmitting antenna; and (II) includes: amplification means for amplifying a received transmission signal; first downconversion means for downconverting a transmission signal amplified by the amplification means; and second downconversion means for demodulating a modulated signal, by downconverting a modulated signal contained in a transmission signal in accordance with a reference signal contained in a transmission signal downconverted by the first downconversion means.

According to the arrangement, upon reception of a wireless broadcast signal, the transmitting apparatus modulates the wireless broadcast signal in accordance with a reference signal, thereby obtaining a modulated signal. The transmitting apparatus then upconverts the modulated signal and the reference signal into a transmission signal. Then, the transmitting apparatus amplifies the transmission signal thus upconverted, thereby obtaining a millimeter wave. Then, the transmitting apparatus transmits the millimeter wave to the receiving apparatus.

In summary, the reference signal and the modulated signal are transmitted as a transmission signal (transmission wave) via the directional transmitting antenna. Then, the transmission signal is received by the directional receiving antenna. Therefore, respective decreases of signal levels (signal strengths) of the reference signal and the modulated signal are small, and a plurality of reflected waves are not caused. As a result, a drop in level of each signal component is small (over a wide range of frequencies) which drop is caused by respective phase shits of the wireless signal and the reference signal. That is, the transmitting apparatus can transmit a transmission signal to the receiving apparatus, with the suppression of respective decreases in signal levels of a wireless signal and a reference signal.

In the receiving apparatus, the transmission signal received via the directional receiving antenna is amplified by the amplification means, and then, downconverted by the first downconversion means to an intermediate frequency.

This increases a bandwidth ratio of a center frequency with respect to the transmission signal (multiple wave signal). This allows only passage of a component of a reference signal contained in a transmission signal in an intermediate frequency band, by filter means such as a common microwave planar circuit.

Amplification of the reference signal by the amplification means makes it possible to deal with the reference signal as a pseudo local oscillator signal. This makes it possible to carry out downconversion again by the second downconversion means in accordance with the pseudo local oscillator signal. As a result, the receiving apparatus can decode (demodulate) a signal identical with a wireless signal received by the transmitting apparatus.

According to the arrangement, both local oscillators of the transmitting apparatus and the receiving apparatus have a frequency change and a phase noise. However, downconversion of a transmission signal to an intermediate frequency band on the receiving apparatus side makes it possible to cancel a frequency deviation and a phase noise of each local oscillator. As a result, it is possible to improve reception sensitivity. In addition, according to the arrangement, the transmitting apparatus does not require a strict power control of a reference signal. This advantageously reduces manufacturing cost of a transmitting apparatus, and expands a permissive range of levels of signals to be supplied to the transmitting apparatus.

The millimeter wave transceiving system is preferably arranged such that the receiving apparatus further includes detection means for (i) obtaining a part of a transmission signal transmitted from the transmitting apparatus, (ii) detecting a signal level of the part of the transmission signal, and (iii) producing a sound which has a sound volume or a tone in accordance with the signal level thus detected.

In installation of the transmitting apparatus, the reflecting plate, and the receiving apparatus, it is necessary to carry out position adjustment and direction adjustment of the transmitting apparatus, the reflecting plate, and the receiving apparatus. In some cases, a television has a function of indicating an antenna level. However, a user cannot always view a television screen while performing position adjustment and direction adjustment.

According to the arrangement above, the detection means notifies a user of a signal level of a transmission signal, by producing a beep which has a sound volume or a tone in accordance with the signal level. This allows an easy direction adjustment of the transmitting apparatus, and position adjustment and direction adjustment of the reflecting plate.

The function of beeping allows a user to check whether or not the transmitting apparatus, the reflecting plate, and the receiving apparatus are working normally even if the transmitting apparatus, the reflecting plate, and the receiving apparatus are displaced due to room cleaning.

The millimeter wave transceiving system is preferably arranged such that the transmitting apparatus (i) receives a broadcast signal in which a plurality of broadcast signals are multiplexed, (ii) amplifies, so as to obtain a transmission signal as a millimeter wave, the plurality of broadcast signals thus received, and (iii) transmits the transmission signal via the directional transmitting antenna.

According to the arrangement, it is possible to realize a stable transmitting apparatus which is less affected by a blockage of a millimeter wave due to a crossing of a person, presence of a piece of fixture and furniture, or the like. This makes it possible to correctly transmit, to a display apparatus, an electronic device, etc., a plurality of broadcast signals (broadcast wave signals) received by the transmitting apparatus. For example, the arrangement above allows a user to view television and record a television program by a recorder or the like, simultaneously.

Advantageous Effects of Invention

As described above, the millimeter wave transceiving system of the present invention for transmitting and receiving a millimeter wave, includes: a transmitting apparatus for transmitting a millimeter wave; a reflecting plate for reflecting a millimeter wave transmitted from the transmitting apparatus; and a receiving apparatus for receiving a millimeter wave reflected by the reflecting plate, the reflecting plate including a metal plate, a metal sheet, or a metal film, as a reflecting surface for reflecting a millimeter wave.

The reflecting plate of the present invention is a reflecting plate in a millimeter wave transceiving system, the millimeter wave transceiving system including: a transmitting apparatus for transmitting a millimeter wave; a reflecting plate for reflecting a millimeter wave transmitted from the transmitting apparatus; and a receiving apparatus for receiving a millimeter wave reflected by the reflecting plate, the reflecting plate including a metal plate, a metal sheet, or a metal film, as a reflecting surface for reflecting a millimeter wave.

This makes it possible to realize a millimeter wave transceiving system which allows an easy installation.

BRIEF DESCRIPTION OF DRAWINGS

FIG. 1 is a schematic diagram illustrating an arrangement of a millimeter wave transceiving system of a first embodiment of the present invention.

Figure 2:
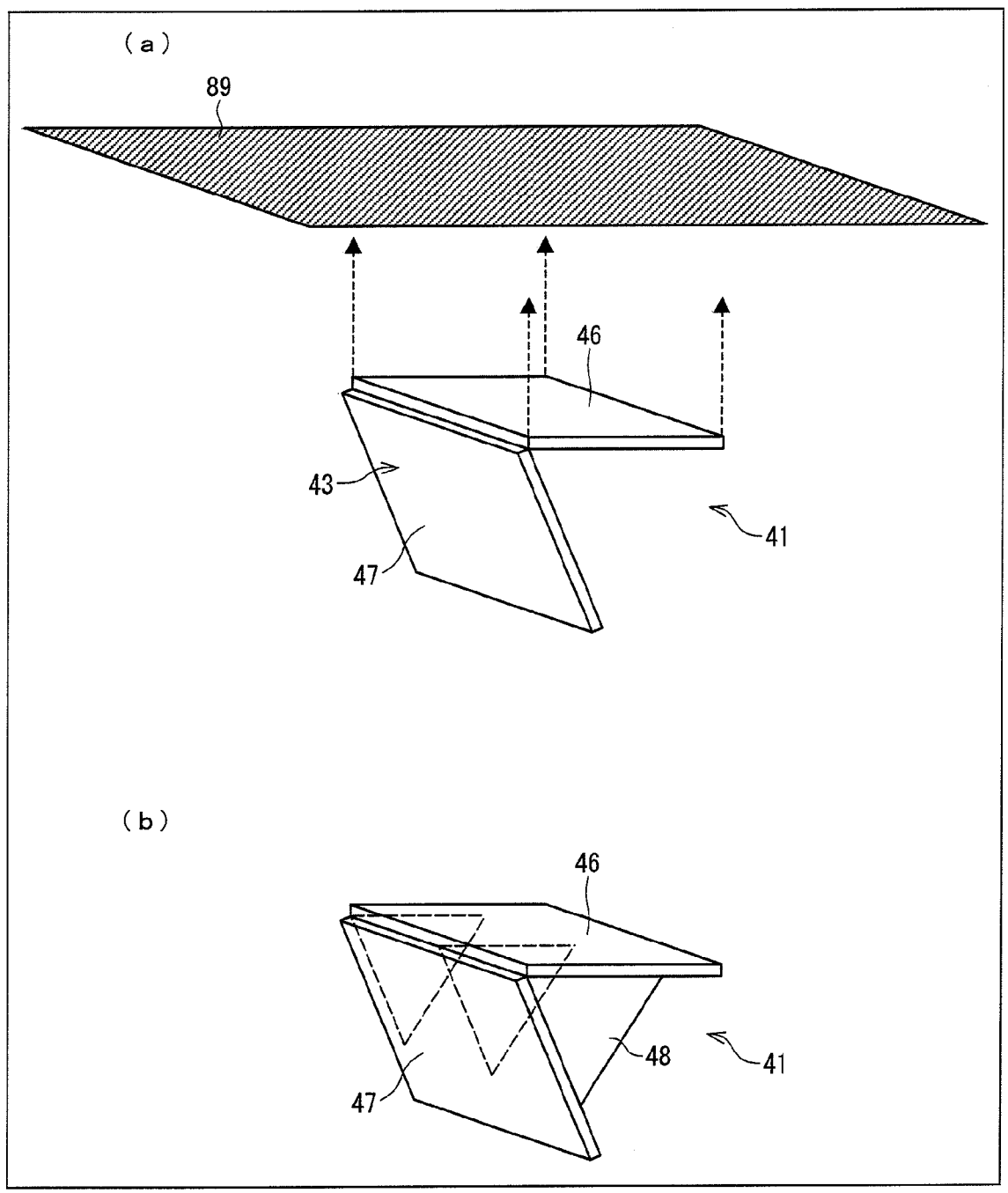
FIG. 2

(a) is an explanatory diagram illustrating an example of installation of a reflecting plate to a ceiling. (b) of FIG. 2 is a schematic diagram illustrating an arrangement of the reflecting plate.

FIG. 3

Figure 3:
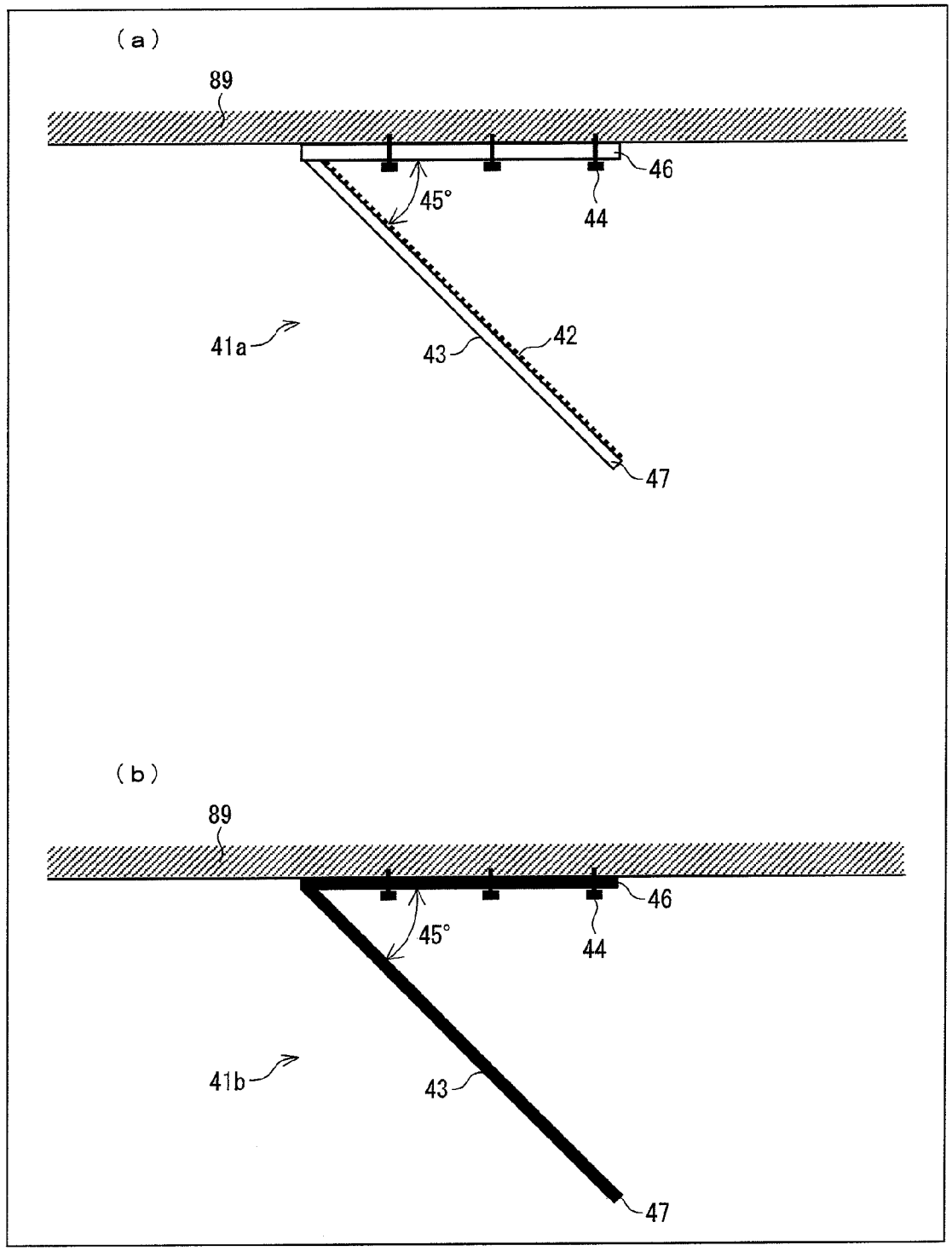

(a) is a cross-sectional view illustrating a reflecting plate having a reflecting surface made of a metal foil or a metal film. (b) of FIG. 3 is a cross-sectional view illustrating a reflecting plate having a reflecting surface made of a metal plate.

FIG. 4

(a) is a view illustrating a receiving apparatus mounted on a television rack. (b) of FIG. 4 is a view illustrating the receiving apparatus provided on a surface of a television.

FIG. 5

Figure 5:
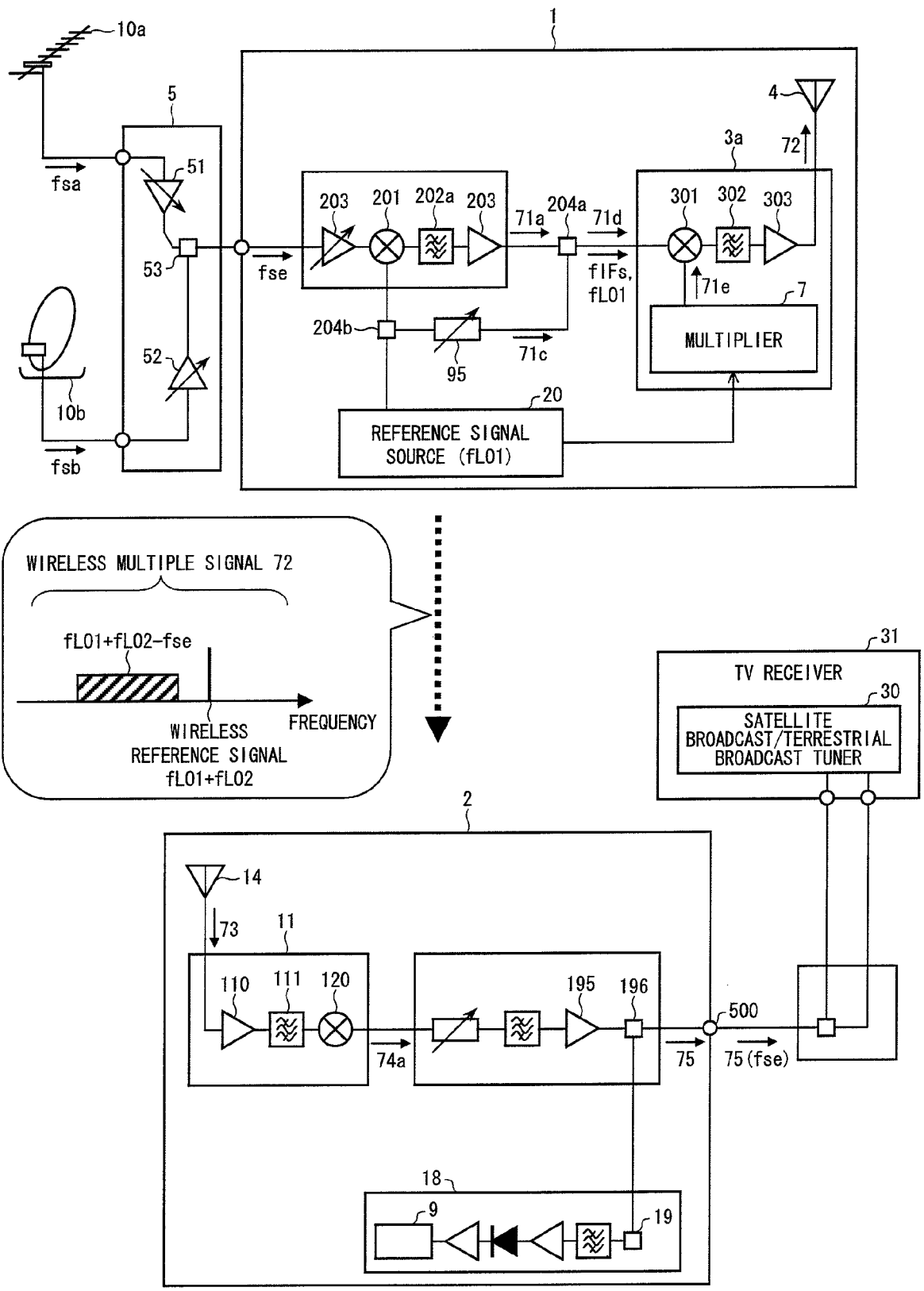

FIG. 5 is a circuit diagram showing a first detailed arrangement of the millimeter wave transceiving system of the present invention.

FIG. 6

Figure 6:
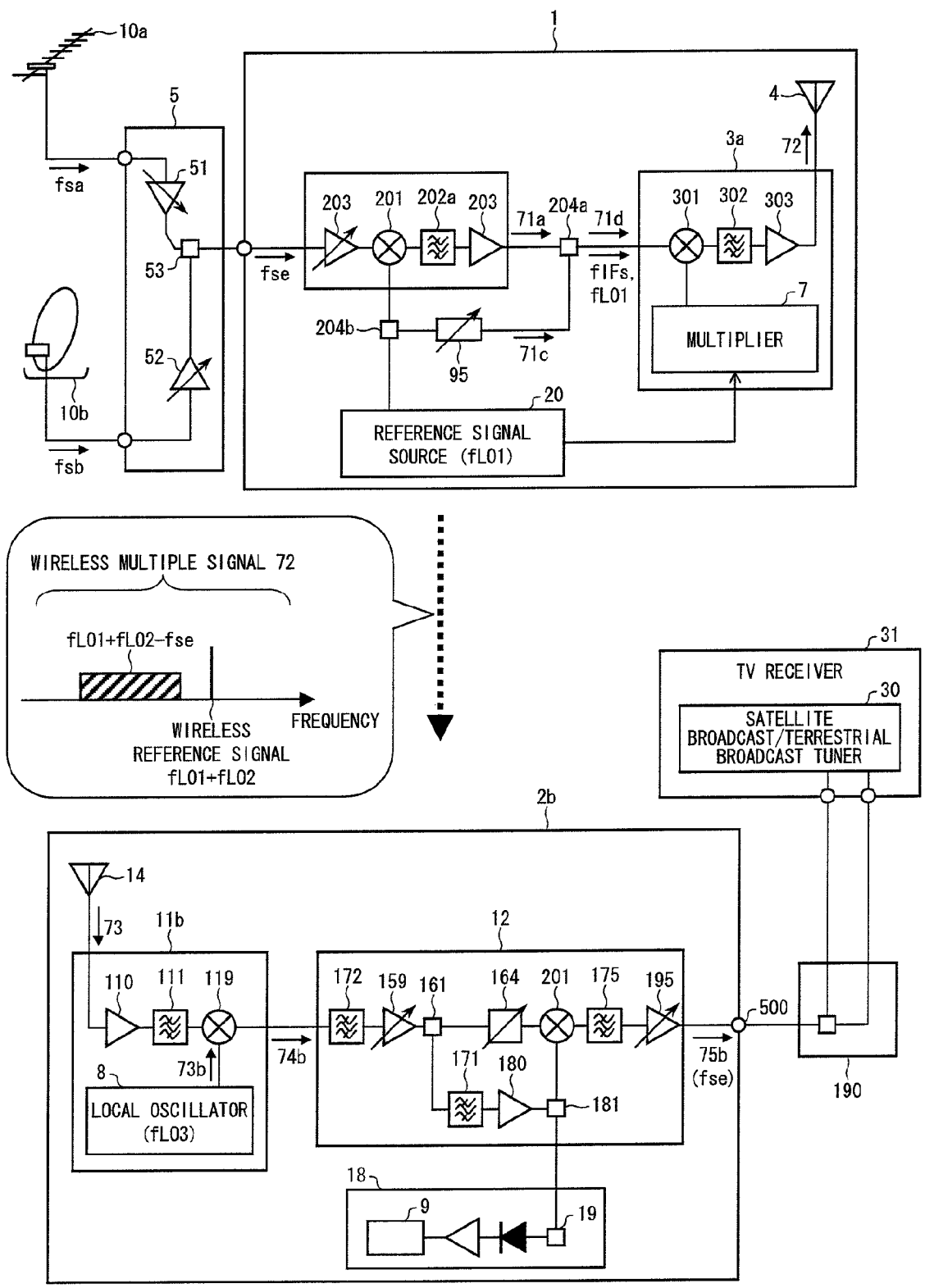

FIG. 6 is a circuit diagram showing a second detailed arrangement of the millimeter wave transceiving system of the present invention.

FIG. 7

Figure 7:
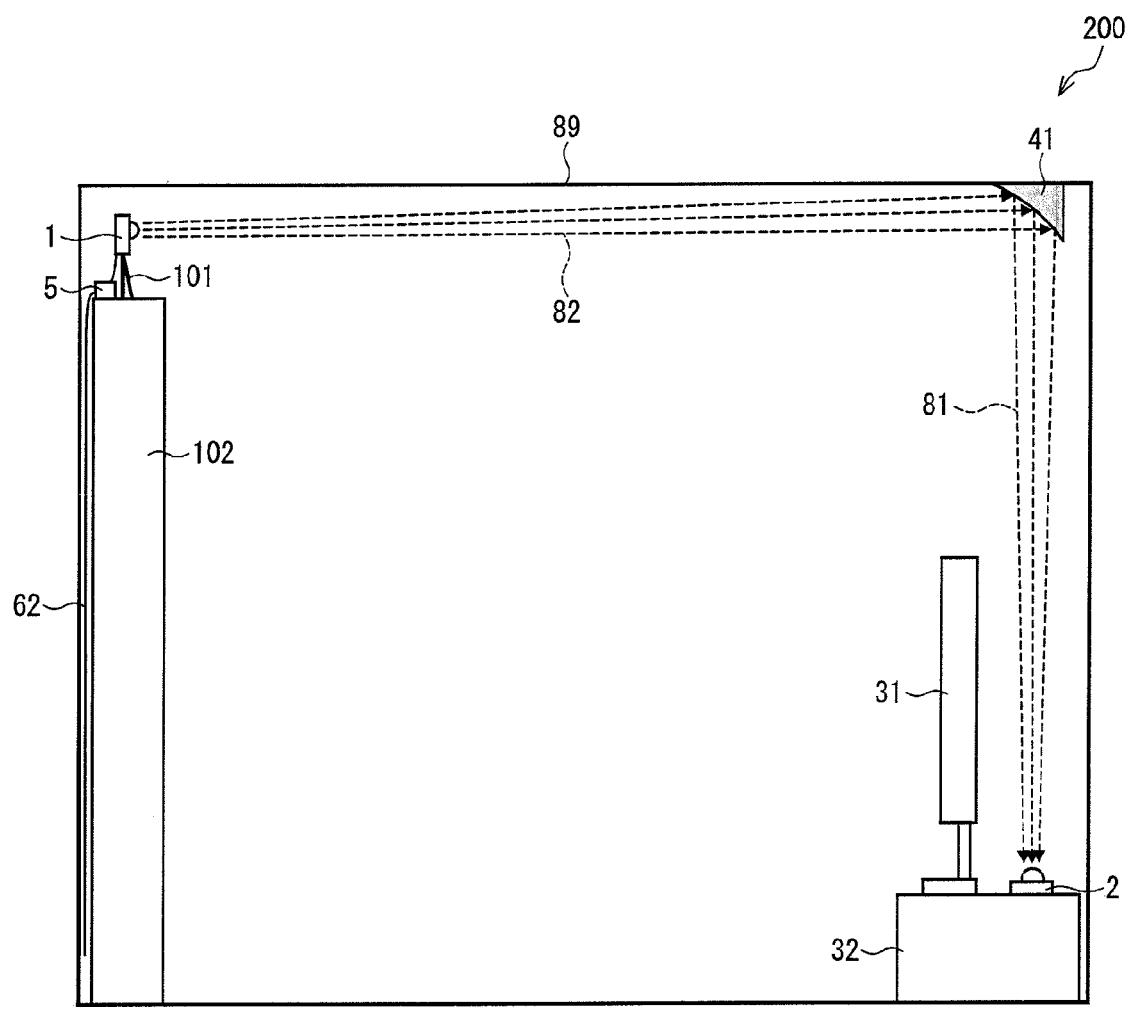

FIG. 7 is a schematic diagram illustrating an arrangement of a millimeter wave transceiving system of a second embodiment of the present invention.

FIG. 8

Figure 8:
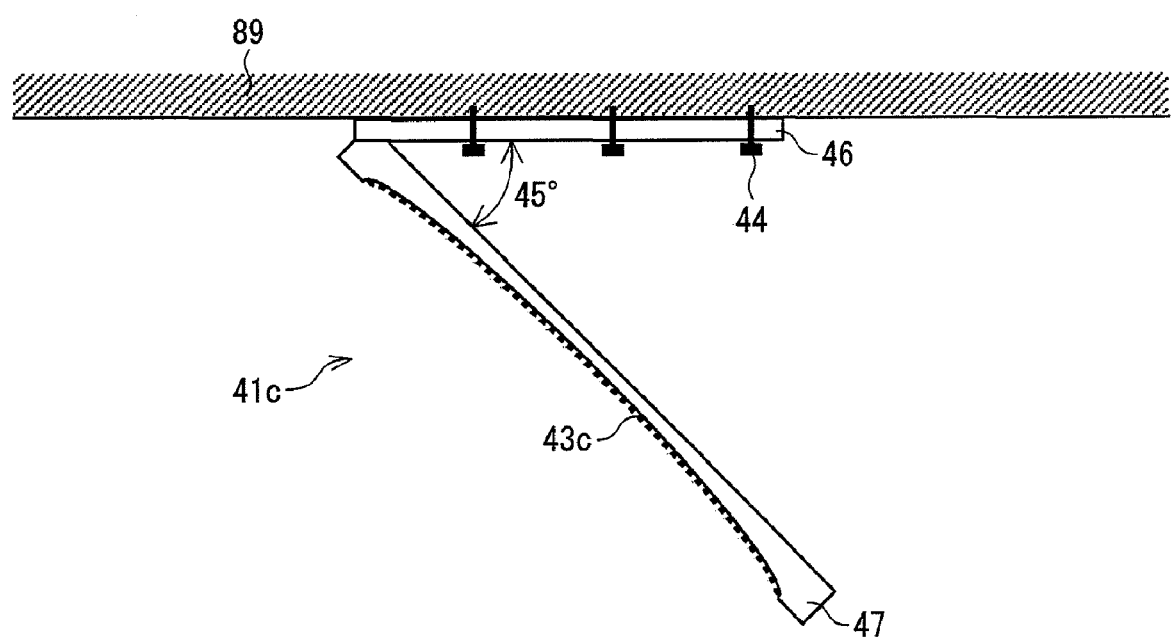

FIG. 8 is a side view illustrating an arrangement of a reflecting plate of the millimeter wave transceiving system illustrated in FIG. 7.

FIG. 9

Figure 9:
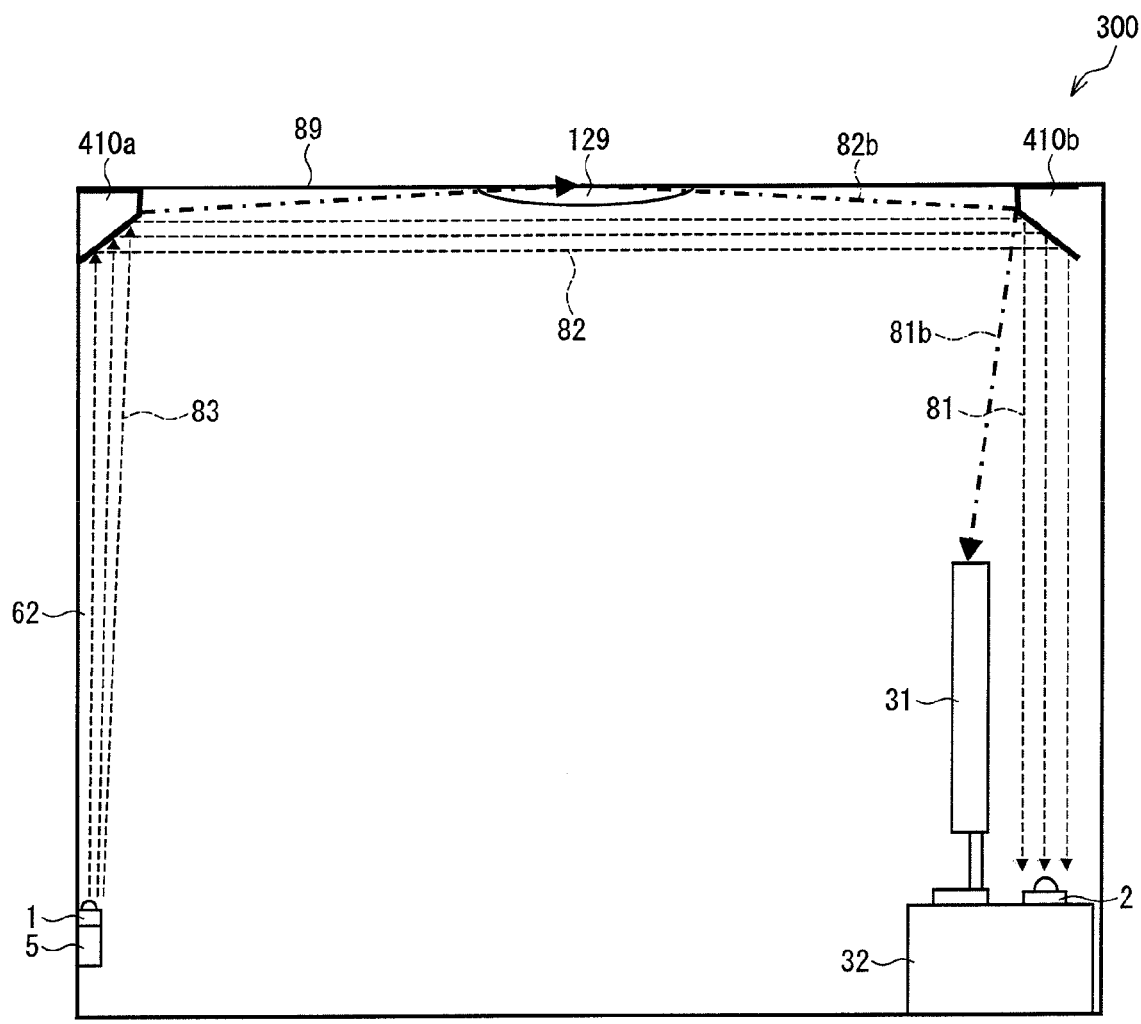

FIG. 9 is a schematic diagram illustrating an arrangement of a millimeter wave transceiving system of a third embodiment of the present invention.

FIG. 10

Figure 10:
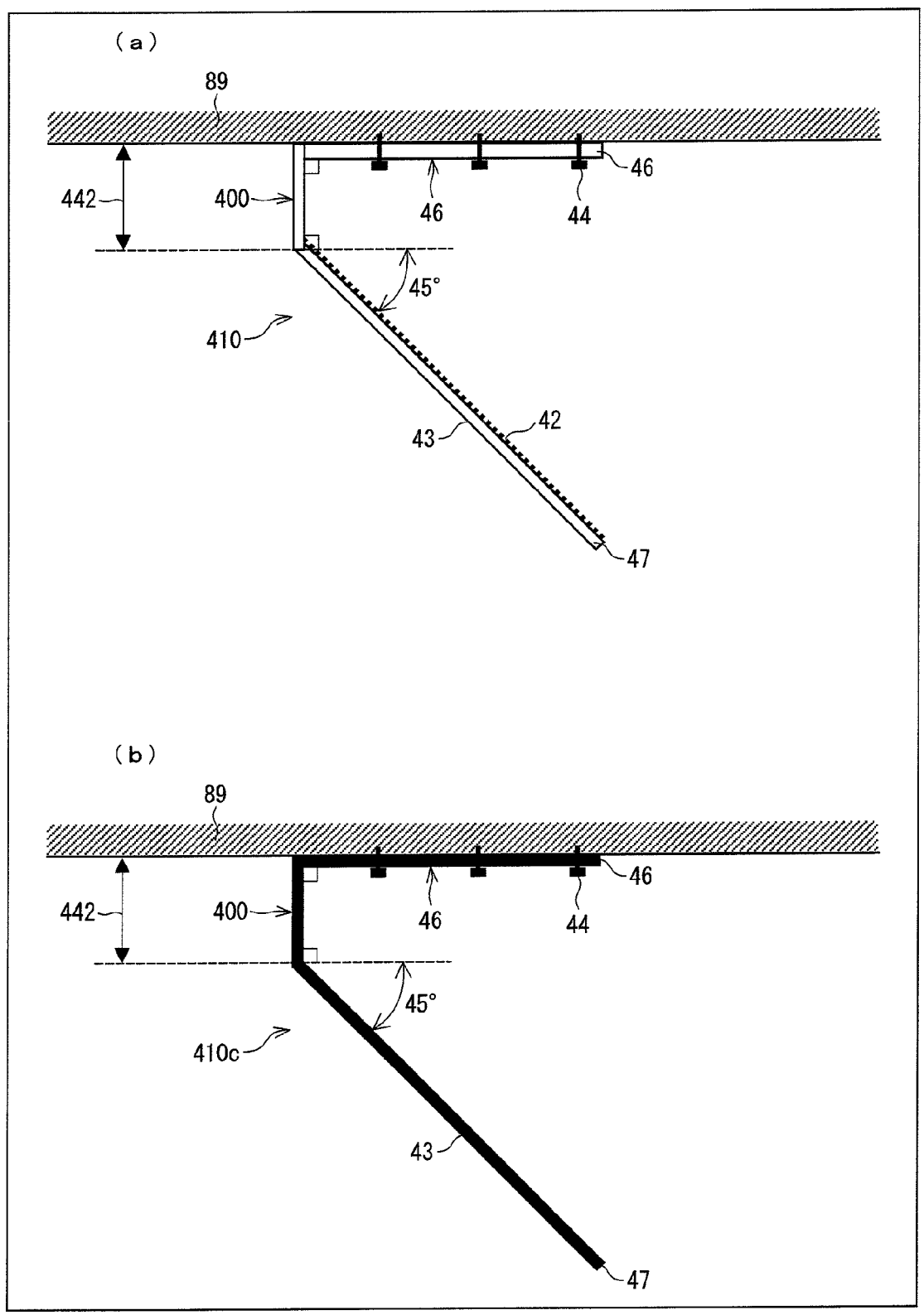

(a) is a side view illustrating an arrangement of a reflecting plate illustrated in FIG. 9. (b) of FIG. 10 is a side view illustrating a modification of the arrangement.

FIG. 11

Figure 11:
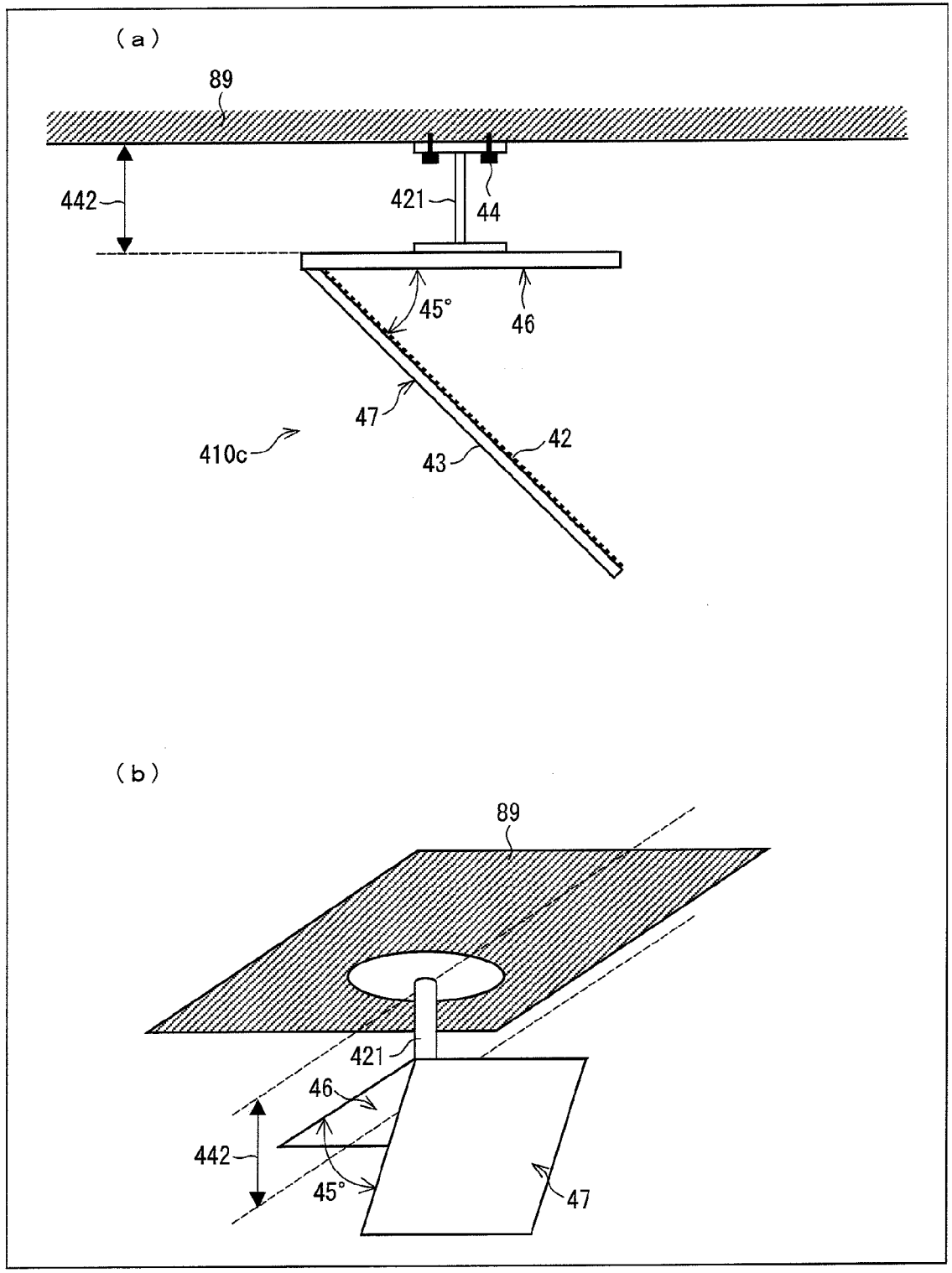

(a) is a side view illustrating a reflecting plate installed on a ceiling via a supporting column. (b) of FIG. 11 is a perspective view corresponding to (a) of FIG. 11.

FIG. 12

Figure 12:
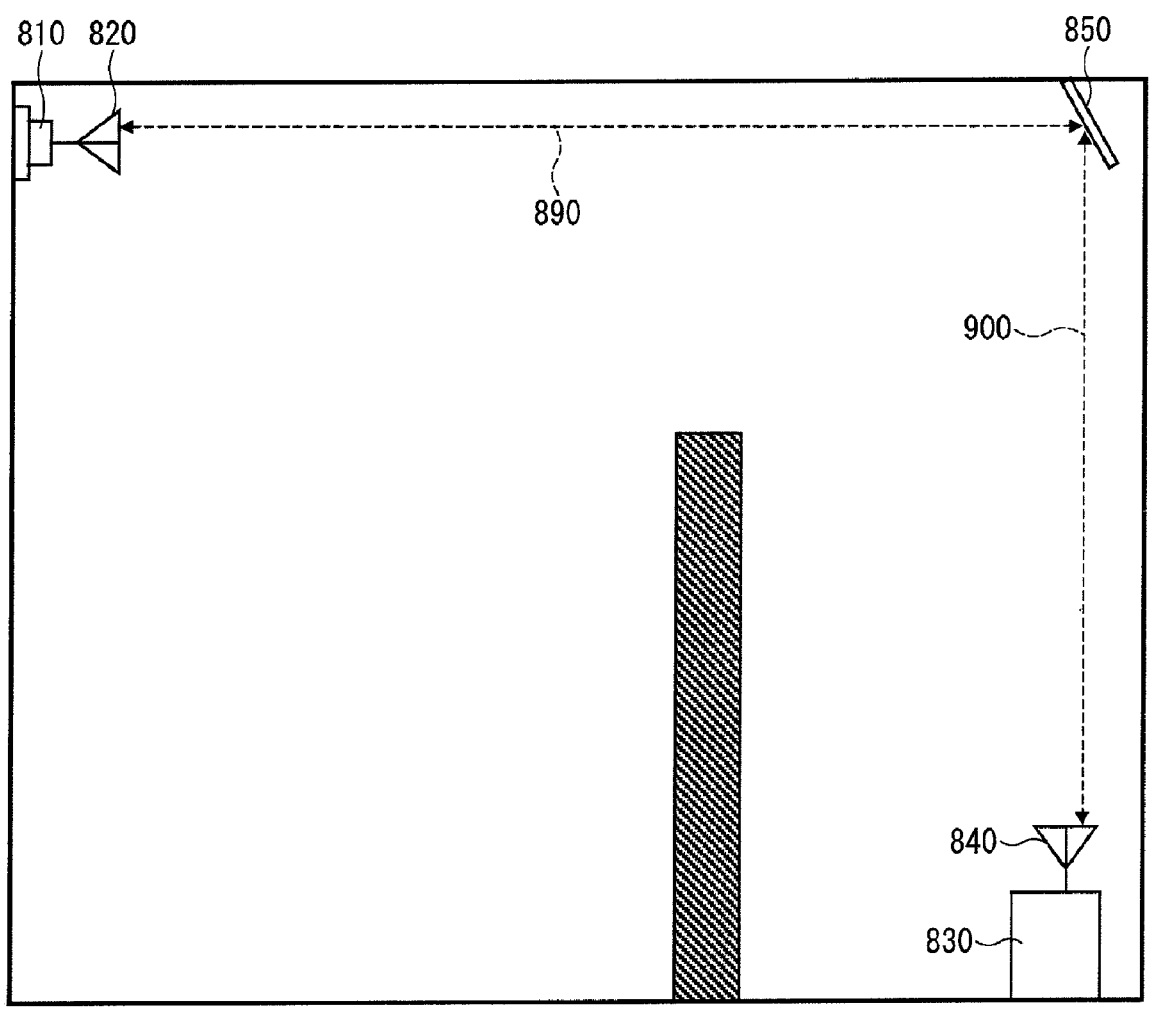

FIG. 12 is a schematic diagram illustrating an arrangement of an indoor wireless communications system, which is a first conventional example according to a conventional art.

FIG. 13

Figure 13:
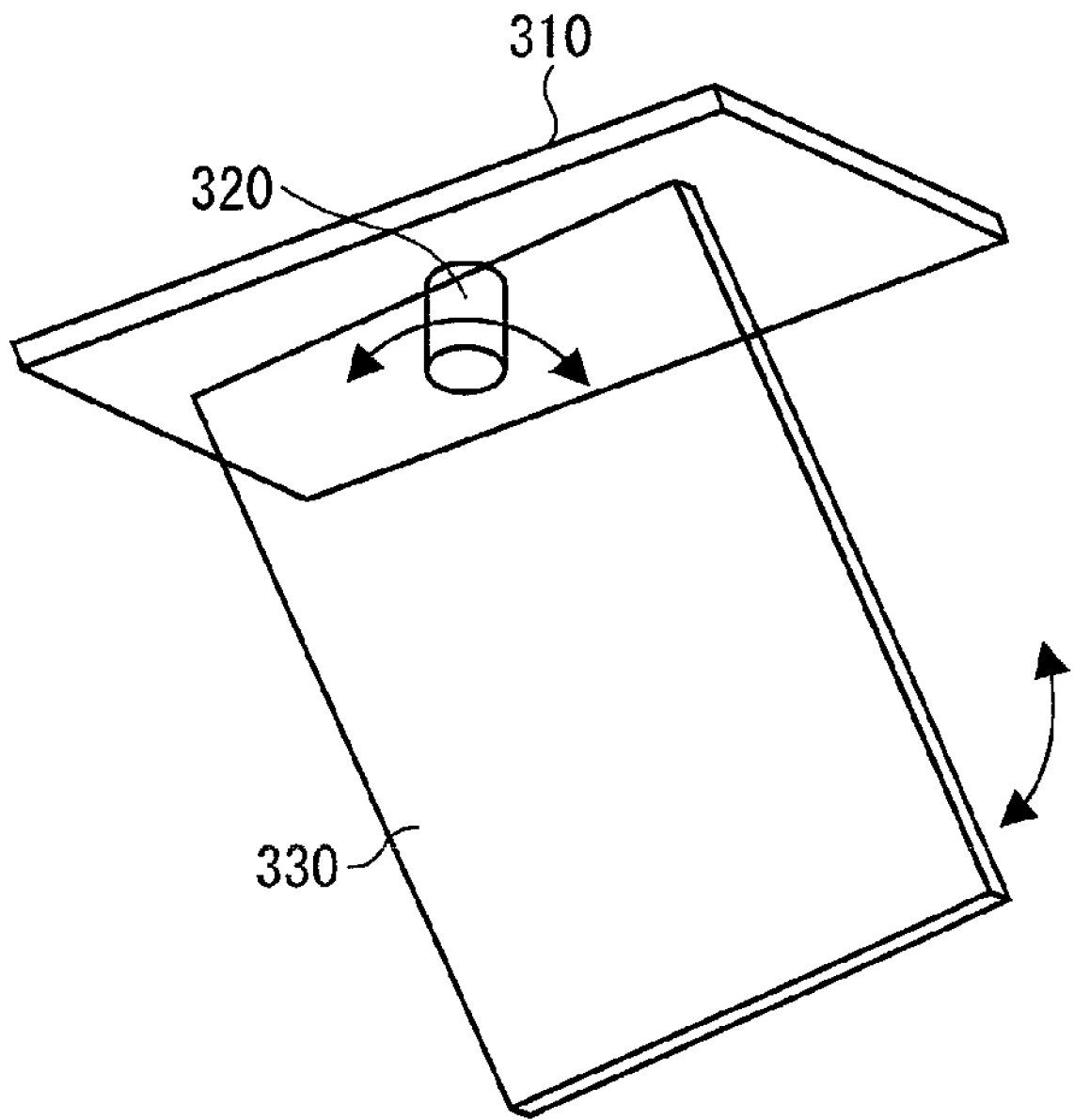

FIG. 13 is a schematic diagram illustrating an arrangement of a reflecting mirror used in an optical space transmission system, which is a second conventional example according to a conventional art.

REFERENCE SIGNS LIST

1 Transmitting apparatus
2 and 2b Receiving apparatus
4 Transmitting antenna
5 Level adjuster/power supply
12 Reference signal regenerating/frequency converter circuit (second downconversion means)
14 Receiving antenna
18 Level detector (detection means)
31 Television (display apparatus)
32 Television rack
34 Supporting shaft
41, 41a, 41b, and 41c Reflecting plate
43 and 43c Reflecting surface
89 Ceiling
100, 200, and 300 Millimeter wave transceiving system
110 Low-noise amplifier (amplification means)
120 Two-terminal mixer (downconversion means)
201 Frequency mixer (modulation means)

Description of Embodiments

The following describes the present invention in more detail, with reference to illustrated embodiments.

[First Embodiment]

(Overview of Millimeter Wave Transceiving System 100)

Figure 1:
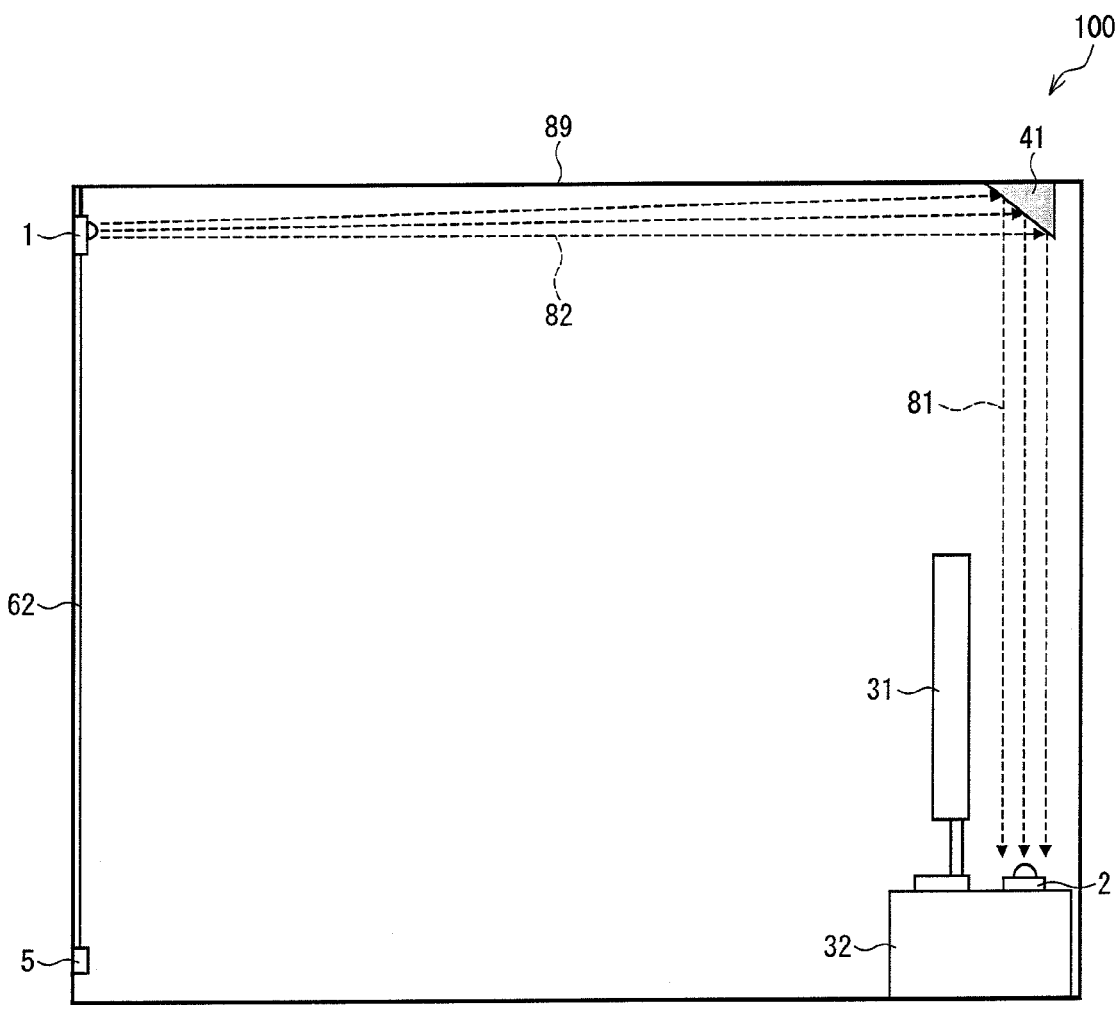
FIG. 1

FIG. 1 is an arrangement example illustrating an overview of a millimeter wave transceiving system 100.

As illustrated in FIG. 1, the millimeter wave transceiving system 100 is provided indoors. The millimeter wave transceiving system 100 includes a transmitting apparatus 1 for transmitting an electric wave whose frequency falls in a millimeter waveband (hereinafter, the electric wave is referred to as millimeter wave), a reflecting plate 41 for reflecting a transmission signal (millimeter wave) transmitted from the transmitting apparatus 1, and a receiving apparatus 2 for receiving a transmission signal (millimeter wave) reflected by the reflecting plate 41.

As one example of the millimeter wave transceiving system 100, the present embodiment describes a millimeter wave video multiple transmission system, provided indoors, e.g., in a living room, which (i) upconverts a broadcast wave such as a digital broadcast wave so that the broadcast wave has a frequency in a 60 GHz frequency band and then (ii) transmits, as the transmission signal, the broadcast wave thus upconverted.

The millimeter wave transceiving system 100 is arranged as below. A transmission signal in a millimeter wave band transmitted from the transmitting apparatus 1 is propagated via a transmission path 82, and is then caused by the reflecting plate 41 to change its traveling angle vertically downward. The reflecting plate 41 has a reflecting surface inclined by approximately 45° with respect to a ceiling 89 so as to reflect a transmission signal vertically downward. The transmission signal thus reflected is propagated via a transmission path 81, and then enters the receiving apparatus 2 which is mounted on a television rack (television stand) 32 so as to be behind a television 31.

The transmitting apparatus 1 is provided on a wall near the ceiling 89, and connected, via a coaxial cable 62, to a level adjuster/power supply 5, which is connected to an indoor terminal of a broadcast antenna. The level adjuster/power supply 5 is connected, via the indoor terminal of broadcast antenna, to outdoor antennas such as a terrestrial broadcast receiving antenna and/or a satellite broadcast receiving antenna. The level adjuster/power supply 5 properly (i) amplifies, to a level required by the transmitting apparatus 1, a signal supplied via the indoor terminal of the broadcast antenna, and (ii) adds a DC (direct current) voltage of 15V required by the transmitting apparatus 1 to the signal thus amplified, so as to supply the signal to the transmitting apparatus 1 via the coaxial cable 62.

The transmitting apparatus 1 is fixed by use of, e.g., a metal fixer so as to suspend in an indoor high position near the ceiling 89. Alternatively, the transmitting apparatus 1 can be installed on a wall supporting the ceiling 89. The transmitting apparatus 1 receives a signal supplied from the level adjuster/power supply 5 via the coaxial cable 62, and converts the signal thus received into a transmission signal so as to supply the transmission signal to the reflecting plate 41 via the transmission path 82.

The reflecting plate 41 is provided in the transmission path 82 so as to be on the ceiling 89. The reflecting plate 41 has a reflecting surface for reflecting a transmission signal transmitted from the transmitting apparatus 1. Specifically, the reflecting surface of the reflecting plate 41 reflects, toward the receiving apparatus 2 via the transmission path 81, a transmission signal transmitted from the transmitting apparatus 1 via the transmission path 82.

The receiving apparatus 2 is provided, e.g., in the vicinity of the television 31 (display apparatus) or on the television rack 32. The receiving apparatus 2 receives a transmission signal reflected by the reflecting plate 41, and supplies the transmission signal to the television 31.

(Transmitting Apparatus 1)

The following describes a concrete method for installing the transmitting apparatus 1.

The transmitting apparatus 1 includes a directional transmitting antenna for receiving a millimeter wave.

For example, the transmitting apparatus 1 is installed, in a position away from the ceiling 89 by approximately 15 cm, so that a direction in which the transmitting apparatus 1 for transmitting a millimeter wave emits a beam (i.e., a direction in which a millimeter wave is transmitted: the transmission path 82) becomes substantially parallel to the ceiling 89.

The directional transmitting antenna preferably has an angle of beam spread which is not less than that of a receiving antenna of the receiving apparatus 2. The reason for this is that the arrangement allows an easy installation etc. because the arrangement ensures irradiation of a beam on an entire surface of the reflecting plate 41. This allows an increase in a degree of freedom for positional relations among the transmitting apparatus 1, the reflecting plate 41, and the receiving apparatus 2. An angle of beam spread of the receiving antenna can be determined depending on an area of a reflecting surface 43 of the reflecting plate 41.

Specifically, in a case where the directional transmitting antenna of the transmitting apparatus 1 has an angle of beam spread of ±15° for example, a distance between the transmitting apparatus 1 and the ceiling 89 is preferably in a range from approximately 5 cm to approximately 15 cm. This makes it possible to greatly reduce an effect of reflection from the ceiling 89 itself.

In other words, a transmission signal in a millimeter wave band transmitted from the transmitting apparatus 1 is partially reflected from the ceiling 89 if the transmitting apparatus 1 is provided near the ceiling 89. (i) The transmission signal, in a millimeter wave band, which has been reflected from the ceiling 89 (reflected wave reflected from the ceiling 89) and (ii) the transmission signal, in a millimeter wave band, which has been transmitted, without being reflected from the ceiling 89, from the transmitting apparatus 1 to the reflecting plate 41 (direct wave) can be reflected by the reflecting plate 41, and are then received by the receiving apparatus 2 as a transmission signal (multipath signal) containing both the transmission signals (i) and (ii) thus reflected by the reflecting plate 41.

A phase of the reflected wave reflected by the ceiling 89, which is a part of the transmission signal transmitted from the transmitting apparatus 1, is inverted by 180°, as compared to the direct wave, due to reflection from the ceiling 89. Accordingly, phases of the transmission signals incident on the reflecting plate 41 are not identical but greatly differ from each other even if incident angles of the respective transmission signals do not greatly differ from each other. Such transmission signals reflected by the reflecting plate 41 cause the receiving apparatus 2 to receive an electric wave affected by multipath fading. This causes a decrease in a reception quality MER (Measurement Error Rate) and/or a C/N (Carrier to Noise) ratio.

In contrast, in a case where the transmitting apparatus 1 is away from the ceiling 89 by a distance falling in a range from approximately 5 cm to approximately 15 cm as is described above, an undesired signal, i.e., a multipath signal which causes a noise is reflected by the reflecting plate 41 at such an angle that causes the receiving apparatus 2 not to receive the multipath signal. As a result, it is possible to suppress reception of a multipath signal.

(Reflecting Plate 41)

The following describes how to arrange and install the reflecting plate 41, with reference to (a) and (b) of FIG. 2, and (a) and (b) of FIG. 3.

(a) of FIG. 2 is an explanatory view illustrating how the reflecting plate 41 is installed to the ceiling 89. (b) of FIG. 2 is a schematic diagram illustrating how the reflecting plate 41 is arranged. (a) of FIG. 3 is a cross-sectional view illustrating a reflecting plate having a reflecting surface made of a metal foil or a metal film. (b) of FIG. 3 is a cross-sectional view illustrating a reflecting plate having a reflecting surface made of a metal plate.

As illustrated in (a) of FIG. 2, the reflecting plate 41 includes a first plate 47 having the reflecting surface 43 and a second plate 46 provided so as to incline with respect to the first plate 47. The second plate 46 is fixed to the ceiling 89 so that the reflecting plate 41 is installed on the ceiling 89.

As illustrated in (b) of FIG. 2, the reflecting plate 41 can further include a supporting plate 48 having a shape of a rectangular equilateral triangle so that an angle defined by the first plate 47 and the second plate 46 is fixed.

In a case where the supporting plate 48 is provided so as to be perpendicular to the first plate 47 and the second plate 46, it becomes easy to secure accuracy of the angle defined by the first plate 47 and the second plate 46 and the angle scarcely changes over time. As such, it is possible to (i) stably fix the reflecting plate 41 to the ceiling 89 and (ii) secure a stable wireless transmission path.

The reflecting plate 41 can be replaced by a reflecting plate 41a illustrated in (a) of FIG. 3. According to the reflecting plate 41a, a first plate 47 and a second plate 46 both made of a sheet such as an expanded polystyrene sheet or a polypropylene sheet are bonded with the use of an adhesive or the like, and an aluminum tape is attached onto a reflecting surface 43.

Specifically, the first plate 47 and the second plate 46 can be easily prepared, for example, by bonding, with the use of an adhesive or the like, two expanded polystyrene sheets each having a thickness of few millimeters or two polypropylene sheets each having a thickness not more than 1 mm. The reflecting surface 43 is prepared by attaching an aluminum tape onto the first plate 47. An electrically conductive sheet 42 is provided on a back surface (i.e., a side opposite to the reflecting surface 43) of the first plate 47. The reflecting plate 41a can be installed on the ceiling 89 by just fixing the second plate 46 on the ceiling 89 with the use of a tape or screws 44.

The angle defined by the first plate 47 and the second plate 46 preferably is approximately 45°. This makes it possible to prevent a direction in which a millimeter wave is reflected by the reflecting plate 41a from greatly deviating from a vertical downward direction, even if a horizontal angle of the reflecting plate 41a is adjusted in a case where the reflecting plate 41a is installed on, e.g., the ceiling 89 so that the second plate 46 of the reflecting plate 41a becomes parallel with a horizontal plane.

Alternatively, the reflecting plate 41 can be replaced by a reflecting plate 41b illustrated in (b) of FIG. 3. According to the reflecting plate 41b, a first plate 47 and a second plate 46 are prepared by folding a single metal plate such as an aluminum plate. In the case of a metal plate such as an aluminum plate having a thickness falling in a range from approximately 0.3 mm to approximately 1 mm, the reflecting plate 41b can be prepared by folding, at an angle of 45°, a flat aluminum plate having an area of 15 cm by 30 cm into a twofold one having an area of 15 cm by 15 cm. It is possible that a sheet such as a thin piece of paper or a plastic sheet to which a design is subjected is further attached onto the first plate 47 of the reflecting plate 41b made of an aluminum plate. A millimeter wave mostly passes through the sheet, and is then reflected by the aluminum plate. Such a design makes it possible for the reflecting plate 41 to less adversely affect a room appearance, or makes it possible to use the reflecting plate 41 as an interior accessory.

The reflecting plate 41 (41a or 41b) is installed so that (i) the second plate 46 is parallel with a direction in which a transmission signal is transmitted via the transmission path 82 and (ii) the first plate 47 blocks the transmission path 82.

As described above, the first plate 47 and the second plate 46 are connected at a tilt angle defined by them.

Therefore, it is possible to install the reflecting plate 41 merely by (i) rotating the reflecting plate 41 only horizontally to adjust a rotation angle of the reflecting plate 41 so that the receiving apparatus 2a receives a transmission signal having a maximum signal level or a maximum reception C/N ratio and (ii) fixing the reflecting plate 41 by use of a fixing member such as a tape or the screws 44. A function of evaluating a signal level of or a reception C/N ratio of a transmission signal is usually provided, as a function of evaluating an antenna level, inside a television capable of receiving digital broadcast. Use of the function allows an adjustment of a rotation angle of the reflecting plate 41.

The reflecting plate 41 thus eliminates the need for any difficult adjustment of a rotation angle because the reflecting plate 41 does not require a biaxial rotation function unlike a conventional reflecting mirror.

(Receiving Apparatus 2)

The following describes how to install the receiving apparatus 2, with reference to (a) and (b) of FIG. 4.

(a) of FIG. 4 is a view illustrating the receiving apparatus 2 mounted on the television rack 32. (b) of FIG. 4 is a view illustrating the receiving apparatus 2 provided on a surface of the television 31.

As illustrated in (a) of FIG. 4, the receiving apparatus 2 is provided (i) on a back surface side of the television 31, i.e., on a side opposite to a side of a display screen (not illustrated) of the television 31 and (ii) on a horizontal surface of the television rack 32. Note that the reflecting plate 41 is preferably provided such that a substantial center of the first plate 47 of the reflecting plate 41 is an extension of a vertical line extending from the receiving apparatus 2.

Alternatively, the receiving apparatus 2 can be provided on a supporting shaft 34 which is perpendicularly provided on a base 33 of the television 31 (see (b) of FIG. 4).

In a case where the television 31 is, for example, a middle-sized or small-sized liquid crystal television, the television 31 has a swing function of rotating the display screen of the television 31 by rotating the display screen around the supporting shaft 34 which is perpendicularly extends. In the case of a common middle-sized or small-sized liquid crystal television, its supporting shaft 34 can rotate by about ±20° in directions in which the liquid crystal television itself horizontally rotates around the supporting shaft 34. As such, in a case where the receiving apparatus 2 is installed on the top surface of the supporting shaft 34, around which the television 31 rotates, provided on the surface of the television 31, no relative positional relation is changed between the receiving apparatus 2 and the reflecting plate 41 even if the display screen of the television 31 is rotated.

In the case of a large-sized slim television having no swing function (i.e., television having no rotary shaft), the receiving apparatus 2 can be installed anywhere, provided that the receiving apparatus 2 is provided on a back surface side of the large-sized slim television opposite to a display screen side of the large-sized slim television but is provided so that no obstacle exists between the receiving apparatus 2 and the reflecting plate 41. Note that in the case of a conventional CRT television (not illustrated) which has some space on its top surface, a receiving apparatus 2 can be installed on the top surface of the conventional CRT television.

As illustrated in (a) and (b) of FIG. 4, a receiving antenna 14 of the receiving apparatus 2 is preferably a lens antenna made of dielectric.

It is difficult to put a thing on the receiving antenna 14 in a case where the receiving apparatus 2 is mounted on the television rack 32 for the television 31. This is because the lens antenna has a hemispherical shape. This makes it possible to reduce a frequency of blockage of a millimeter wave.

(Area of Reflecting Surface)

The following describes an area of the reflecting surface 43 of the reflecting plate 41.

In a case where the reflecting plate 41 is installed on the ceiling 89, it is preferable that the reflecting plate 41 has a reflecting surface 43 having an area of not less than a square of a half wavelength but not more than $\sqrt{2} \cdot (2h \cdot \tan \theta) \cdot (2h \cdot \tan \theta)$, where h represents a distance between the ceiling 89 and the receiving apparatus 2 (height), and θ represents a half bandwidth of the receiving antenna 14.

According to the reflecting plate 41, the reflecting surface 43 has an area, at a height h (distance), which is not more than an irradiated area of the receiving antenna 14. That is, the area of the reflecting surface 43 is not more than an area in which the receiving antenna 14 receives a transmission signal. This makes it possible to secure reflection efficiency and prevent the reflecting plate 41 from increasing in its size. Accordingly, it is possible to save space on the ceiling 89. In addition, a room appearance is less adversely affected.

An irradiated area of the receiving antenna 14 of the receiving apparatus 2 is indicated by (2h·tan θ)×(2h·tan θ). In a case where the reflecting surface 43 is tilted by 45° with respect to the ceiling 89, a longitudinal length of the reflecting surface 43 is changed to √2·(2h·tan θ). As a result, the reflecting surface 43 has an area of √2·(2h·tan θ)·(2h·tan θ). For example, a preferable installation area for the reflecting plate 41 is approximately an area of 21 cm by 30 cm in a case where h is 2 m and θ is 3°.

However, the reflecting plate 41 having an area of 21 cm by 30 cm is somewhat too large to be installed on the ceiling 89. According to experiments, an area of 15 cm by 15 cm realizes a fine characteristic. The reason for this can be explained as below. Assume a reflection from the reflecting surface 43 of the reflecting plate 41 is a total reflection (i.e., reflection coefficient=1). An area of 15 cm by 15 cm is approximately 36% of an area of 21 cm by 30 cm. Accordingly, a reception energy is reduced to approximately ⅓. This corresponds to an attenuation of −4.8 dB in terms of dB. The reception energy usually includes a sufficient margin in view of a design of a regular communications line.

A smallest area of the reflecting surface 43 is equal to a square of a half wavelength of an operating frequency. In a case where the reflecting surface 43 has an area smaller than this, the reflecting surface 43 has difficulty in serving as a reflecting surface. Therefore, the reflecting plate 43 should have an area sufficiently larger than a square of a half wavelength of an operating frequency.

(Detailed Arrangement Example 1 of Millimeter Wave Transceiving System 100)

The following describes an arrangement example of the transmitting apparatus 1 and the receiving apparatus 2, with reference to FIG. 5.

FIG. 5 is a circuit diagram illustrating in detail how the millimeter wave transceiving system 100 is configured.

As illustrated in FIG. 5, the level adjuster/power supply 5 is connected, via the indoor terminals for the broadcast antenna, to a terrestrial broadcast receiving antenna 10a and a satellite broadcast receiving antenna 10b which are provided outdoors. The level adjuster/power supply 5 receives a signal fsa (wireless broadcast signal) of terrestrial broadcast as an input signal via the terrestrial broadcast receiving antenna 10a. On the other hand, the level adjuster/power supply 5 receives a signal fsb (wireless broadcast signal) of satellite broadcast wave via the satellite broadcast receiving antenna 10b.

Booster amplifiers 51 and 52 in the level adjuster/power supply 5 appropriately amplify the signals fsa and fsb, respectively. Then, a connecting terminal 53 of the level adjuster/power supply 5 carries out combining and multiplexing with respect to the signals fsa and fsb thus amplified so that a multiplexed signal is supplied, as a single series signal fse (frequency: fse) to the transmitting apparatus 1 via the coaxial cable 62 (not illustrated in FIG. 5).

The transmitting apparatus 1 receives the single series of signal fse, as an input signal, from the level adjuster/power supply 5. The single series signal fse is subjected to a level adjustment by an amplifier 203, and is then supplied to a frequency mixer 201.

A reference signal source 20 supplies a reference signal 71c (frequency: fLO1), is split into two by a connecting terminal 204b. One of the two reference signals 71c thus split is supplied to the frequency mixer 201 (modulating means; modulator).

In the frequency mixer 201, the signal fse, which has been supplied from the amplifier 203 and has been subjected to the level adjustment, is combined with the reference signal 71c supplied from the connecting terminal 204b, so as to be upconverted to a wireless signal 71a (modulated signal) having an intermediate frequency (frequency: fIF1). The wireless signal 71a thus upconverted is supplied to a connecting terminal 204a, via a filter 202a and the amplifier 203.

The other of the two reference signals 71c split at the connecting terminal 204b is supplied to the connecting terminal 204a via a variable attenuator 95.

As a result, the wireless signal 71a and the other one of the two reference signals 71c thus split are combined in the connecting terminal 204a. This causes an intermediate frequency multiplexed signal 71d (Frequencies: fIF1 and fLO1) to be supplied, via the connecting terminal 204a, to a transmission converter 3a.

The following summarizes a relation between signals and frequencies of the intermediate frequency multiplexed signal 71d supplied via the connecting terminal 204a. The signal fse supplied to the transmitting apparatus 1 is converted into and is then outputted from the connecting terminal 204a as below.

Reference signal (signal): fLO1 (frequency)

Wireless signal (signal): $fLO1-fse=fIF1$ (frequency)

Then, (i) the intermediate frequency multiplexed signal 71d supplied to the transmission converter 3a (upconversion means; upconverter) and (ii) a local oscillator signal 71e (frequency: fLO2) generated by an m-th (m: integer of not less than 2) order multiplier 7, are supplied to the frequency mixer 301. As a result, the intermediate frequency multiple signal 71d is upconverted by the frequency mixer 301, and is then filtered by a filter 302 so that only an upper sideband passes through the filter 302. The upper sideband is amplified by a millimeter wave power amplifier 303, and is then transmitted, as a wireless multiple signal 72, from the transmitting apparatus 1 via the transmitting antenna 4.

In summary, the transmission converter 3a (i) upconverts the intermediate frequency multiplexed signal 71d containing the wireless signal 71a modulated by the frequency mixer 201 and the reference signal 71c, (ii) amplifies the intermediate frequency multiple signal 71d so as to obtain a millimeter wave, and (iii) transmits the millimeter wave as a wireless multiplexed signal 72 via the transmitting antenna 4.

The following summarizes a relation between signals and frequencies of the wireless multiple signal 72 supplied via the transmitting antenna 4. In summary, the intermediate frequency multiplexed signal 71d is converted by the transmission converter 3a as below.

Reference signal (signal): $fLO2+fLO1=(2m+1)fLO1$ (frequency)

Wireless signal (signal): $fLO2+fIF1=fLO2+(fLO1-fse)=(2m+1)fLO1-fse$ (frequency)

The present embodiment employs m=5 (Accordingly, 2m+1=11).

As shown above, the signal fse supplied to the transmitting apparatus 1 is eventually upconverted into the wireless multiple signal 72 containing (i) the reference signal whose frequency is (2m+1) times as high as the frequency fLO1 of the reference signal 71c, i.e., whose frequency is 11 times as high as the frequency fLO1 and (ii) the wireless signal whose frequency is (2m+1) times as high as the frequency fLO1, i.e., whose frequency is 11 times as high as the frequency of the signal fse. Then, the wireless multiple signal 72 is transmitted via the transmitting antenna 4.

On the other hand, the wireless multiplexed signal 72 transmitted via the directional transmitting antenna 4 of the transmitting apparatus 1 is received via the directional receiving antenna 14 as a wireless multiplexed signal 73 (transmission signal).

The wireless multiplexed signal 73 thus received is supplied to a reception converter 11.

The wireless multiplexed signal 73 is amplified by a low-noise amplifier 110 (amplification means), (ii) its image signal is suppressed by a band-pass filter 111, (iii) its wireless signal [frequency: (2m+1)fLO1−fse] is downconverted by a two-terminal mixer 120 (downconversion means) in accordance with the reference signal [frequency: (2m+1)fLO1] contained in the wireless multiple signal 73, and (iv) a signal 74a is then outputted from the reception converter 11.

A downconversion process carried out by the reception converter 11 can be described as below. Specifically, the wireless multiple signal 73 supplied to the reception converter 11 is converted by the reception converter 11 into the signal 74a as below.

A wireless signal is downconverted in accordance with a reference signal:

$$[(2m+1)fLO1-fse]-[(2m+1)fLO1]=fse$$

A signal fse can be thus obtained as the signal 74a supplied from the reception converter 11.

That is, the signal 74a thus downconverted is obtained by decoding (demodulating) the single series of signal fse supplied to the transmitting apparatus 1. The signal fse thus decoded has nothing to do with a frequency deviation and phase noise characteristics of the reference signal 71c (frequency: fLO1) in the transmitting apparatus.

The signal 74a outputted from the reception converter 11 is appropriately adjusted by a variable attenuator. Then, the signal 74a passed through a filter is appropriately amplified by an amplifier 195, and is then outputted as a signal 75 (signal fse) from the receiving apparatus 2 via a connecting terminal 196 and an output terminal 500. The signal 75 is supplied to the television 31 or an electronic device such as a video recorder.

The transmitting apparatus 1 and the receiving apparatus 2 each have a level detector 18 (detection means) which produces a sound, having a sound volume or tone, in accordance with a signal level (signal strength) of the signal fsa of terrestrial broadcast or a signal level of the signal fsb of satellite broadcast.

The present embodiment deals with an arrangement in which the receiving apparatus 2 includes a level detector 18.

A switch 19 of the level detector 18 is connected to the connecting terminal 196. While the switch 19 is in an ON state, the signal 75 which is outputted to the output terminal 500 via the connecting terminal 196 is branched to the switch 19. The signal 75 supplied to the switch 19 is supplied to a beeper 9 via circuits such as a filter and an amplifier which are connected as needed to the switch 19. This causes the beeper 9 to beep in accordance with a signal level of the signal 75.

In the installation of the millimeter wave transceiving system 100, position adjustment and direction adjustment are required for the transmitting apparatus 1, the reflecting plate 41, and the receiving apparatus 2. Some televisions 31 have a function of indicating an antenna level. However, it is not always possible to allow a user to determine in real time, based only on such a function, whether or not the position adjustment and direction adjustment of the transmitting apparatus 1 and the reflecting plate 41 have been properly done. This is because the user can not always view a television screen while carrying out the position adjustment and direction adjustment.

In contrast, in a case where at least one of the receiving apparatus 2 and the transmitting apparatus 1 includes a level detector 18, it is possible to properly carry out position adjustment and direction adjustment of the transmitting apparatus 1 and the reflecting plate 41 with the aid of a function of notifying a user of a signal strength of a received signal by a sound volume or a tone of a sound of a beeper 9 of a level detector 18.

Note that the switch 19 is turned off (OFF) while the function of the beeper 9 is not used. The function of the beeper 9 allows a user to check whether or not the transmitting apparatus 1, the reflecting plate 41, and the receiving apparatus 2 are in their proper positions even if the transmitting apparatus 1, the reflecting plate 41, and the receiving apparatus 2 are moved due to room cleaning or the like.

(Detailed Arrangement Example 2 of Millimeter Wave Transceiving System 100)

The following shows another example of respective circuit configurations of a transmitting apparatus 1 and a receiving apparatus 2.

FIG. 6 is a circuit diagram illustrating how a millimeter wave transceiving system 100 is configured.

The transmitting apparatus 1 is the same as that of the detailed circuit configuration example 1 of the foregoing millimeter wave transceiving system 100, except for a receiving apparatus 2b. Specifically, the receiving apparatus 2b is different from the receiving apparatus 2 in that the receiving apparatus 2b (i) generates a second intermediate frequency multiplexed signal 74b by first downconverting a local oscillator signal 73b (frequency: fLO3) which is an output of a local oscillator 8, and (ii) includes a reference signal regenerating/frequency converter circuit 12 as a second downconversion means.

In a reception converter 11b, instead of the two-terminal mixer 120 of the reception converter 11, a frequency mixer 119 (first downconversion means) is connected to a band-pass filter 111. The frequency mixer 119 is further connected to the local oscillator 8.

A wireless multiple signal 73 supplied to the reception converter 11b via a receiving antenna 14 is amplified by a low-noise amplifier 110 (amplification means). An image signal contained in the wireless multiple signal 73 is removed by the band-pass filter 111. Then, the wireless multiplexed signal 73 from which the image signal is removed is downconverted by the frequency mixer 119 with the use of a local oscillator signal 73b (frequency: fLO3) supplied from the local oscillator 8, and is then outputted from the frequency mixer 119 as a second intermediate frequency multiplexed signal 74b.

A process in which the wireless multiple signal 73 is downconverted into the second intermediate frequency multiple signal 74b can be described as below. Specifically, a reference signal and a wireless signal contained in the wireless multiplexed signal 73 supplied to the reception converter 11b are converted into the intermediate frequency multiplexed signal 74b as below.

Downconversion of reference signal:

$(2m + 1)fLO1 - fLO3$

Downconversion of wireless signal:

$(fLO2 + fIF1) - fLO3$ $= fLO2 - fLO3 + (fLO1 - fse)$ $= (2m + 1)fLO1 - fLO3 - fse$ The receiving apparatus 2b includes a reference signal regenerating/frequency converter circuit 12 as a second downconverter. A second intermediate frequency multiplexed signal 74 outputted from the reception converter 11b is supplied to the reference signal regenerating/frequency converter circuit 12.

The second intermediate frequency signal 74b supplied to the reference signal regenerating/frequency converter circuit 12 first passes through a filter 172, is subjected to amplification and level adjustment by an intermediate frequency amplifier 159, and is then split into two by the connecting terminal 161. One of the two second intermediate frequency multiple signals 74b thus split is subjected to extraction and amplification of a reference signal by a band-path filter 171 and by an amplifier 180, respectively. The reference signal is thus regenerated. The reference signal thus regenerated by the amplifier 180 has a local oscillator frequency used in second downconversion. That is, the reference signal can be regarded as a pseudo local oscillator signal used in the second downconversion. The reference signal thus regenerated is supplied to a frequency mixer 201 via a connecting terminal 181.

On the other hand, the other of the two second intermediate frequency signals 74b thus split by the connecting terminal 161 is subjected to a level adjustment, by a few decibels, by a variable attenuator 164, and is then downconverted by the frequency mixer 201 in accordance with the reference signal thus regenerated. The single series of signal fse is thus decoded (demodulated). The series of single series signal fse thus decoded (i) is subjected to a level adjustment by a filter 175 connected to the frequency mixer 201 as needed, (ii) is appropriately amplified by an amplifier 195 to a proper output level, and (iii) is then outputted, as a signal 75b (signal fse), from the receiving apparatus 2b via an output terminal 500. The signal 75b is supplied to a television 31 or an electronic device such as a video recorder.

As described above, a frequency conversion is carried out from an intermediate frequency band to a frequency band of the single series signal fse so that a signal supplied to the transmitting apparatus 1 is decoded in the receiving apparatus 2b.

A process of frequency conversion above can be described as below in which an intermediate frequency is converted to a frequency of the signal fse which is an original signal supplied to the transmitting apparatus 1. Specifically, the second intermediate frequency multiplexed signal 74b supplied to the reference signal regenerating/frequency converter circuit 12 is converted to a signal 75b by the reference signal regenerating/frequency converter circuit 12 as below.

Downconversion of a second intermediate frequency multiplexed signal to an original signal (signal fse):

$[(2m+1)fLO1-fLO3]-[(2m+1)fLO1-fLO3-fse]=fse$

As is the case with the receiving apparatus 2, the signal thus downconverted by the receiving apparatus 2b is obtained by decoding the single series of signal fse supplied to the transmitting apparatus 1. The signal fse thus decoded has nothing to do with a frequency deviation and phase noise characteristics of the reference signal 71c (frequency: fLO1) in the transmitting apparatus 1.

As compared with the receiving apparatus 2, the receiving apparatus 2b is arranged so as to (1) cause the intermediate frequency amplifier 159 of the receiving apparatus 2b to carry out amplification, (2) cause the band-path filter 171 and the amplifier 180 to carry out regeneration of a reference signal, and (3) cause the frequency mixer 201 to carry out a downconversion. This allows the receiving apparatus 2b to have a higher conversion gain of a receiving apparatus. In addition, the receiving apparatus 2b is arranged so as to amplify and reproduce a reference signal. This makes it possible to obtain a higher reception CN (carrier to noise) characteristic, as compared to the receiving apparatus 2. As a result, this allows a long transmission distance.

Furthermore, according to the receiving apparatus 2b, it is not necessary for the transmitting apparatus 1 to strictly carry out power control of a reference signal. This brings about advantages such as a reduction in manufacturing cost of the transmitting apparatus 1 and expansion of the permissible range of levels of signals to be supplied to the transmitting apparatus 1.

Furthermore, the connecting terminal 181 is connected to a level detector 18. A reference signal regenerated by the band-path filter 171 and the amplifier 180 is partially branched by the connecting terminal 181 to the switch 19 of the level detector 18. The arrangement is made for a function of notifying a user, by a sound volume or tone of a beep of the beeper 9 in accordance with a signal level of a reference signal, of whether or not direction adjustment and position adjustment of the transmitting apparatus 1 and the reflecting plate 41 are properly done.

Note that, while the transmitting apparatus 1 is in an ON state, the transmitting apparatus 1 always transmits a reference signal having a frequency of (2m+1)fLO1 to the receiving apparatus 2b even if no input signal of a broadcast wave is supplied to the transmitting apparatus 1. As such, in a case where the reference signal (i) is solely downconverted by the frequency mixer 119 in accordance with a signal (local oscillator signal 73b), having a frequency of fLO3, which is supplied from the local oscillator 8, (ii) is extracted, and (iii) is then subjected to a level detection, it is possible (a) to detect respective transmission losses generated in the transmitting apparatus 1, the reflecting plate 41, and the receiving apparatus 2b, (b) to adjust respective positions and respective angles, in the horizontal plane, of the transmitting apparatus 1, the reflecting plate 41, and the receiving apparatus 2b, and (iii) to minimize wireless transmission losses generated among the transmitting apparatus 1, the reflecting plate 41, and the receiving apparatus 2b.

The receiving apparatus 2b thus makes it possible to minimize wireless transmission losses before a signal of a broadcast wave is supplied to the transmitting apparatus 1. As a result, it is possible to efficiently dispose a wireless system. That is, it is possible to efficiently dispose the transmitting apparatus 1, the reflecting plate 41, and the receiving apparatus 2b.

[Second Embodiment]

The following describes a second embodiment, with reference to FIGS. 7 and 8.

FIG. 7 is a schematic diagram illustrating how a millimeter wave transceiving system 200 is arranged in the second embodiment. FIG. 8 is a side view illustrating how the reflecting plate illustrated in FIG. 7 is arranged.

Members which are common to those of the first embodiment are given the respective same reference numerals, and descriptions for the respective members are omitted.

The following describes differences between the present embodiment and the first embodiment. The first embodiment describes an example where the reflecting surface 43 of the reflecting plate 41 (reflecting plate 41*a* or 41*b*) is a flat surface. Unlike the first embodiment, a reflecting surface 43*c* of a reflecting plate 41*c* of the second embodiment is a concave surface.

In addition, the transmitting apparatus 1 is fixed, with the use of a tripod 101, on a top surface of a piece of fixture and furniture 102 such as a chest of drawers.

A level adjuster/power supply 5 is connected to an indoor terminal of a broadcast antenna via a coaxial cable 62. The level adjuster/power supply 5 is provided on an area of the top surface of the fixture and furniture 102, on which area the tripod 101 is provided. The level adjuster/power supply 5 and the transmitting apparatus 1 are also connected with each other via the coaxial cable 62.

As is the case with the first embodiment, the transmitting apparatus 1 is provided approximately 15 cm away from a ceiling 89. The fixture and furniture 102 is not limited to the chest but can be a rack such as a bookshelf. Alternatively, the transmitting apparatus 1 can be attached to a tip of a stand having a pole whose length is approximately 2 m (e.g., stand having a pole used as a floor lamp or the like). This realizes the following advantages. That is, the coaxial cable 62 can be concealed inside the pole, and the transmitting apparatus 1 can become easily installed (not illustrated).

As illustrated in FIG. 8, the reflecting surface 43*c* of the reflecting plate 41*c* is a concave surface.

This causes a beam of a millimeter wave reflected from the reflecting surface 43*c* to be converged, in a direction (in a reflection direction), onto the receiving apparatus 2. This allows development of a millimeter wave transceiving system 200 having a higher sensitivity. Specifically, for example, a focal length of the reflecting surface 43*c* having a concave shape is adjusted to a distance from the reflecting surface 43*c* to the receiving apparatus 2, i.e., to a height of approximately 45 cm of the television rack 32 (i.e., approximately 2 m from the ceiling 89). This allows the reflecting plate 41*c* to converge more a millimeter wave on the receiving antenna 14 of the receiving apparatus 2, as compared to the reflecting plate 41. This allows development of a millimeter wave transceiving system 200 having an excellent sensitivity characteristic. Note in this case that a diameter of curvature of the concave surface of the reflecting surface 43*c* is 4 m, and the concave surface has a long focal length of 2 m. Accordingly, the reflecting surface 43*c* serves as a concave mirror having a gentle curve.

[Third Embodiment]

The following describes how a third embodiment is different from the first embodiment illustrated in FIG. 1, with reference to FIG. 9, (a) and (b) of FIG. 10, and (a) and (b) of FIG. 11.

FIG. 9 is schematic diagram illustrating how a millimeter wave transceiving system 300 is arranged in the third embodiment.

(a) of FIG. 10 is a side view illustrating how a reflecting plate illustrated in FIG. 9 is arranged. (b) of FIG. 10 is a side view illustrating a modification of the reflecting plate illustrated in FIG. 9.

Members which are common to those of the first and second embodiments are given the respective same reference numerals, and descriptions for the respective members are omitted.

The third embodiment is different from each of the first and second embodiments in the number and shape of the reflecting plate.

As illustrated in FIG. 9, a level adjuster/power supply 5 is connected to an indoor terminal of a broadcast antenna. A transmitting apparatus 1 is directly connected to the level adjuster/power supply 5. Two reflecting plates 410 (i.e., reflecting plates 410*a* and 410*b*) are provided in respective positions on a ceiling 89.

The reflecting plate 410*a* is provided on the ceiling 89 so as to be directly above the transmitting apparatus 1. The reflecting plate 410*b* is provided on the ceiling 89 so as to face the reflecting plate 410*a*. As is the case with the first embodiment, a receiving apparatus 2 is provided so as to be directly below the reflecting plate 410*b*. For example, the receiving apparatus 2 is provided on a horizontal surface of a television rack 32 so as to be behind a back surface of the television 31.

As illustrated in (a) and (b) of FIG. 10, each of the reflecting plates 410 (reflecting plates 410*a* and 410*b*) has a third plate 400 (spacer). The third plate 400 is provided between a first plate 47 and a second plate 46 so as to maintain a constant distance between the first plate 47 and the second plate 46. The third plate 400 is orthogonally connected to the second plate 46, and connected to the first plate 47 so as to be inclined by 45° with respect to the first plate 47. That is, the third plate 400 has perpendicular contact with the ceiling 89 since the second plate 46 is parallel with the ceiling 89. The third plate 400 causes a gap 442 to be secured between the reflecting surface 43 of the reflecting plate 410 and the ceiling 89.

The third plate 400 preferably has a width of approximately 15 cm and a height falling in a range from approximately 5 cm to approximately 15 cm. The third plate 400 causes the first plate 47 inclined by 45° with respect to the second plate 46 to shift downward by approximately 5 cm to 15 cm from the ceiling 89.

In other words, the first plate 47 shifts downward by the gap 442 from the ceiling 89. It follows that a transmission path 82 for a millimeter wave also shifts downward from the ceiling 89. This makes it possible to reduce an adverse effect caused by a fluorescent lamp (ceiling light) 129 (see FIG. 9) or the like, which can be an obstacle for a millimeter wave and/or can cause scattering of a millimeter wave.

A thickness of the fluorescent lamp 129 to be attached on the ceiling 89 is approximately 10 cm including a thickness of a plastic cover for a lamp. A metal fixer for the fluorescent lamp 129 has a thickness falling in a range from approximately 5 cm to a little less than 10 cm.

A transmitting antenna 4 of the transmitting apparatus 1 has directivity (beam width) causing a transmitted beam to be radially diffused. Therefore, the presence of the fluorescent lamp 129 causes a relatively small effect of blockage of a transmission path of an electric wave even if the reflecting surface 43, which is inclined by 45°, of the reflecting plate 41 is very close to the ceiling 89, in the case of one-time reflection such as that shown in the first or second embodiment, i.e., in a case where the transmitting apparatus 1 is provided close to the ceiling 89.

In contrast, in a case where the two reflecting plates 410*a* and 410*b* are used so that the reflecting plate 410*a* reflects, to the reflecting plate 410*b*, a transmission signal transmitted from the transmitting apparatus 1 as is the case with the present embodiment, only a signal component substantially parallel with the ceiling 89 is propagated via the transmission path 82. This is because the transmission signal transmitted from the transmitting apparatus 1 is reflected from the reflecting surface 43 inclined by 45°.

Therefore, the fluorescent lamp 129 is likely to affect signal transmission. That is, an electric wave (millimeter wave) collides with the fluorescent lamp 129 in the case of the reflecting plate 41 or 41b, which is used in the first and second embodiments. Accordingly, the electric wave is blocked and/or scattered by the reflecting plate 41 or 41b. As a result, the transmission path 82 is disrupted, thereby deteriorating a state in which the transmission signal is propagated.

As such, in a case where the third plate 400 is provided as is the case with the reflecting plate 410, it is possible to reduce an adverse effect of blockage and/or scattering of a transmission signal by the fluorescent lamp 129 or the like, not only in the case of two-time reflection, but also in the case of one-time reflection.

As is illustrated in (a) of FIG. 10, it is preferable that (i) the reflecting plate 410 is arranged so as to be made from a plastic material such as polystyrene or an acrylic material and (ii) an electrically conductive sheet 42 is formed only on the first plate 47. This makes it possible to reduce an unnecessary reflection component.

Furthermore, the third plate 400 can be a transmitting surface in the case of a one-time reflection system or the like. This makes it possible to easily separate an electric wave into a reflected component and a transmitted component. Alternatively, a plurality of reflecting plates 410 can be cascaded. As is the case with a reflecting plate 410c illustrated in (b) of FIG. 10, the reflecting plate 410 can be alternatively made by folding a single aluminum plate. This makes it possible to form the reflecting plate 410 more easily.

Further, since the reflecting plate 410 has the third plate 400, it is easy for a user to put his hand inside the reflecting plate 410. This allows an easy installation and screw fixation of the reflecting plate 410.

Moreover, the provision of the third plate 400 secures the gap 442 of substantially 5 cm to substantially 15 cm between the ceiling 89 and the reflecting plate 410. Accordingly, even if a millimeter wave once reflected at the ceiling 89 is reflected again by the reflecting plate 410, an incident angle, with respect to the reflecting plate 410, of a transmission signal propagated via the original transmission path 82 is different from an incident angle, with respect to the reflecting plate 410, of the millimeter wave once reflected from the ceiling 89. As a result, the millimeter wave thus reflected again from the reflecting plate 410 is propagated via a transmission path 81b, whereas the original transmission signal thus reflected from the reflecting plate 410 is propagated via the transmission path 81.

This causes a great reduction in a probability that the receiving antenna 14 of the receiving apparatus 2 receives a reflected wave which is reflected from the ceiling 89 or the like, except for the transmission signal which is propagated via the proper transmission path 82. This accordingly reduces an effect of multipath fading, thereby realizing a fine reception characteristic. This ultimately allows realization of a fine reception quality, i.e., a higher MER (Measurement Error Rate) and a higher C/N (Carrier to Noise Ratio) characteristic.

(Additional Remarks)

As illustrated in (a) and (b) of FIG. 11, a reflecting plate 410c can be arranged so that a supporting column 421 is provided via which a second plate 46 is connected to a ceiling 89.

(a) of FIG. 11 is a side view illustrating the reflecting plate 410c installed on the ceiling 89 via the supporting column 421. (b) of FIG. 11 is a perspective view illustrating the reflecting plate 410c illustrated in (a) of FIG. 11.

As illustrated in (a) and (b) of FIG. 11, alternatively, each of (i) the reflecting plate 41 in the first and second embodiments and (ii) the reflecting plate 410 in the third embodiment can be arranged so that a supporting column 421 is provided via which each of the second planes 46 is connected to the ceiling 89. This makes it possible to secure the gap 442 of substantially 5 cm to substantially 15 cm between the reflecting plate 410c and the ceiling 89. This allows the same effect as that obtained by the provision of the third plane 400.

Instead of providing a reflecting plate directly or indirectly on the ceiling 69, it is possible that each of (i) the reflecting plate 41 of the first and second embodiments and (ii) the reflecting plate 410 of the third embodiment is arranged such that each of the second plates 46 is attached to a side wall and a corresponding one of the first plates serves as a reflecting surface which is inclined by a depression angle of 45°.

According to the millimeter wave transceiving system 100, the first plate 47 and the second plate 46 of the reflecting plate 41 close to the ceiling 89 are provided so as to be at a depression angle of 45° with each other. This eliminates the need for adjustment of a depression angle, and it is necessary to merely adjust a horizontal angle. As a result, it becomes remarkably easy to adjust the reflecting plate 41.

In addition, the reflecting plate 41 can be constituted by an aluminum plate having a thickness falling in a range from approximately 0.5 mm to approximately 1 mm. Alternatively, the reflecting plate 41 can be constituted by attaching an aluminum tape onto an expanded polystyrene sheet having a thickness of a few millimeters or on a polypropylene sheet having a thickness of not more than 1 mm.

Since the arrangement realizes the reflecting plate 41 which is significantly light (i.e., the reflecting plate 41 has a weight comparable to that of a plastic sheet for a stationery use), the reflecting plate 41 can be easily installed, with the use of an attaching member such as a screw or a tape, on the ceiling 89 made of a gypsum board or a piece of plywood. This causes a reduction in a load on the ceiling 89. As a result, part of the ceiling 89 hardly falls or peels off.

Even if part of the ceiling 89 falls, it does not injure a person nor break a thing. This allows ease and accuracy of installation, and also allows a remarkable improvement in safety, as compared to a case where a reflecting mirror is installed. Furthermore, the transmitting apparatus 1 can be installed, without being inclined, so that a top surface of the transmitting apparatus 1 and the ceiling 89 are substantially parallel with each other in the vicinity of the ceiling 89, although the transmitting apparatus 1 is installed in a somewhat high position. Therefore, it is possible to easily carry out a positioning of the transmitting apparatus 1 by using a level gauge, a plummet instrument, and the like.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

The millimeter wave transceiving system 100 of the present embodiment can be also described as below.

A millimeter wave transceiving system is characterized in including: a millimeter wave transmitting apparatus, having a directional antenna, which is installed in an indoor high position; a reflecting plate having a metal plate or a metal sheet which has a depression angle of 45° with respect to a horizontal plane in the vicinity of a ceiling; and a millimeter wave receiving apparatus having a directional antenna directing toward the ceiling.

The millimeter wave transceiving system is characterized in that: the reflecting plate includes at least first and second plates which are at an angle of 45° with each other; the second plate is attached to the ceiling; and the first plate is a plate for reflecting a millimeter wave.

The millimeter wave transceiving system is characterized in that: the reflecting plate includes a third plate (i) which is at a right angle with the second plate and (ii) which is at an angle of 135° with the first plate, which is the plate for reflecting a millimeter wave.

The millimeter wave transceiving system is characterized in that: an area of the plate for reflecting a millimeter wave is not more than $\sqrt{2} \cdot (2h \cdot \tan\theta) \cdot (2h \cdot \tan\theta)$ where: h represents a distance between the receiving apparatus and the ceiling; and $\theta$ represents a half bandwidth of a receiving antenna.

The millimeter wave transceiving system is characterized in that: an angle of beam spread of the directional antenna of the transmitting apparatus is not less than that of the directional antenna of the receiving apparatus.

The millimeter wave transceiving system is characterized in that the plate for reflecting a millimeter wave is a concave plate.

The millimeter wave transceiving system is characterized in that: the receiving apparatus is attached to a central part on a surface of a flat-screen television.

The millimeter wave transceiving system is characterized in that: the receiving apparatus is provided on a television stand or on a rack so that the directional antenna of the receiving apparatus has directivity in a vertical direction.

The millimeter wave transceiving system is characterized in that: the receiving apparatus is provided on a back side of a television.

The millimeter wave transceiving system is characterized in that: the directional antenna of the receiving apparatus is a lens antenna made of a dielectric.

The millimeter wave transceiving system is characterized in including that: a reference signal and a modulated signal are transmitted as a transmission wave via the directional antenna of the transmitting apparatus, received via the directional antenna of the receiving apparatus, amplified by an millimeter wave amplifier, and downconverted by a two-terminal mixer means in accordance with the reference signal thus amplified so that the received signal is demodulated into a broadcast signal and the broadcast signal thus demodulated is then transmitted to a receiving terminal.

The millimeter wave transceiving system is characterized in including that: a reference signal and a modulated signal are transmitted as a transmission wave via the directional antenna of the transmitting apparatus, received via the directional antenna of the receiving apparatus, amplified by an millimeter wave amplifier, downconverted by a millimeter wave mixer and a local oscillator, and downconverted by a mixer means in accordance with the reference signal thus amplified so that the received signal is demodulated into a broadcast signal and the broadcast signal thus demodulated is then transmitted to a receiving terminal.

The millimeter wave transceiving system is characterized in further including: detection means for (i) extracting a part of a signal received by the receiving apparatus, (ii) detecting a reception level of the part of the signal, and (iii) beeping at a sound volume or a tone in accordance with the reception level.

The millimeter wave transceiving system is characterized in that: a signal supplied to the transmitting apparatus is combined with a plurality of broadcast wave signals so as to be transmitted as a transmission wave via the directional antenna of the transmitting apparatus.

Industrial Applicability

A reflecting surface of a reflecting plate used in a millimeter wave transceiving system for transmitting and receiving a millimeter wave includes a metal plate, a metal sheet, or a metal film. This realizes a lightweight reflecting plate, thereby allowing an easy installation of the millimeter wave transceiving system. Therefore, the reflecting plate of the present invention is suitably applicable particularly to a millimeter wave transceiving system used indoors.

The invention claimed is:

1. A millimeter wave transceiving system for transmitting and receiving a millimeter wave, comprising:
   a transmitting apparatus configured to transmit a millimeter wave;
   a reflecting plate configured to reflect a millimeter wave transmitted from the transmitting apparatus; and
   a receiving apparatus configured to receive a millimeter wave reflected by the reflecting plate, the reflecting plate having a metal plate, a metal sheet, or a metal film, as a reflecting surface from which the millimeter wave is reflected, wherein
   the reflecting plate further includes a first plate having the reflecting surface, and a second plate provided so as to be inclined with respect to the first plate.

2. The millimeter wave transceiving system as set forth in claim 1, wherein the reflecting plate further includes a spacer configured to maintain a constant distance between the first plate and the second plate.

3. The millimeter wave transceiving system as set forth in claim 1, wherein:
   the transmitting apparatus includes a directional transmitting antenna configured to transmit the millimeter wave; and
   the receiving apparatus includes a directional receiving antenna configured to receive the millimeter wave reflected by the reflecting plate.

4. The millimeter wave transceiving system as set forth in claim 3, wherein an area of the reflecting surface of the reflecting plate is not less than a square of a half wavelength but not more than $\sqrt{2} \cdot (2h \cdot \tan\theta) \cdot (2h \cdot \tan\theta)$, where h represents a distance between a surface on which the reflecting plate is provided and the receiving apparatus, and $\theta$ represents a half bandwidth of the directional receiving antenna.

5. The millimeter wave transceiving system as set forth in claim 3, wherein the directional transmitting antenna has an angle of beam spread of not less than an angle of beam spread of the directional receiving antenna.

6. The millimeter wave transceiving system as set forth in claim 3, wherein a direction in which the directional receiving antenna has directivity is a vertical direction.

7. The millimeter wave transceiving system as set forth in claim 6, wherein the receiving apparatus is provided on a back surface side of a display apparatus, the back surface side being opposite to a side of a display screen of the display apparatus.

8. The millimeter wave transceiving system as set forth in claim 3, wherein the directional receiving antenna is a lens antenna made of a dielectric.

9. The millimeter wave transceiving system as set forth in claim 3, wherein:
   the transmitting apparatus:
   (i) includes a modulator configured to generate a modulated signal, by modulating a received wireless broadcast signal in accordance with a reference signal; and (ii) upconverts the modulated signal generated by the modulator and the reference signal into a transmission signal, amplifies the transmission signal so as to obtain the millimeter wave, and transmits the transmission signal via the directional transmitting antenna, and the receiving apparatus:
(I) receives, via the directional receiving antenna, the transmission signal transmitted via the directional transmitting antenna; and
(II) includes:
an amplifier configured to amplify a received transmission signal; and
a downconverter configured to demodulate a modulated signal, by downconverting a modulated signal in accordance with a reference signal contained in a transmission signal amplified by the amplifier.

10. The millimeter wave transceiving system as set forth in claim 9, wherein
the receiving apparatus further includes a detector configured to (i) obtain a part of the transmission signal transmitted from the transmitting apparatus, (ii) detect a signal level of the part of the transmission signal, and (iii) produce a sound which has a sound volume or a tone in accordance with the signal level thus detected.

11. The millimeter wave transceiving system as set forth in claim 3, wherein:
the transmitting apparatus:
(i) includes a modulator configured to generate a modulated signal, by modulating a received wireless broadcast signal in accordance with a reference signal; and
(ii) upconverts the modulated signal generated by the modulator and the reference signal into a transmission signal, amplifies the transmission signal so as to obtain the millimeter wave, and transmits the transmission signal via the directional transmitting antenna, and the receiving apparatus:
(I) receives, via the directional receiving antenna, the transmission signal transmitted via the directional transmitting antenna; and
(II) includes:
an amplifier configured to amplify the received transmission signal;
a first downconverter configured to downconvert the transmission signal amplified by the amplifier; and
a second downconverter configured to downconvert a modulated signal contained in the transmission signal in accordance with a reference signal contained in the transmission signal downconverted by the first downconverter.

12. The millimeter wave transceiving system as set forth in claim 3, wherein
the transmitting apparatus (i) receives a broadcast signal in which a plurality of broadcast signals are multiplexed, (ii) amplifies, so as to obtain a transmission signal as a millimeter wave, the plurality of broadcast signals thus received, and (iii) transmits the transmission signal via the directional transmitting antenna.

13. The millimeter wave transceiving system as set forth in claim 1, wherein the reflecting surface has a concave shape.

14. The millimeter wave transceiving system as set forth in claim 1, wherein the receiving apparatus is provided on a surface of an axial end of a rotary support shaft that supports a display apparatus.

15. A reflecting plate in a millimeter wave transceiving system, the millimeter wave transceiving system including a transmitting apparatus configured to transmit a millimeter wave, the reflecting plate configured to reflect a millimeter wave transmitted from the transmitting apparatus, and a receiving apparatus configured to receive a millimeter wave reflected by the reflecting plate, the reflecting plate comprising:
a first metal plate, metal sheet, or metal film, as a reflecting surface from which a millimeter wave is reflected; and
a second plate provided so as to be inclined with respect to the first plate.

* * * * *